United States Patent
Inoue et al.

(10) Patent No.: US 6,249,644 B1
(45) Date of Patent: Jun. 19, 2001

(54) ELECTRONIC FILING SYSTEM CAPABLE OF RECORDING IMAGE REPRODUCED FROM DEVELOPED FILM

(75) Inventors: Manabu Inoue, Kobe; Hirokazu Yagura, Sakai; Toru Ishii, Hirakata; Yukari Maeda, Osaka; Tetsuo Yamada, Toyonaka; Katsuyuki Nanba, Osakasayama, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/214,707

(22) Filed: Mar. 18, 1994

(30) Foreign Application Priority Data

Mar. 19, 1993 (JP) .................................................. 5-085296
Mar. 19, 1993 (JP) .................................................. 5-085297
Mar. 19, 1993 (JP) .................................................. 5-085298

(51) Int. Cl.$^7$ ...................................................... H04N 5/76
(52) U.S. Cl. ............................... 386/130; 348/96; 348/97
(58) Field of Search ................................ 358/342, 335, 358/345, 346, 311, 906, 302; 360/13.1, 27, 33.1, 35.1; 348/552, 96, 97, 207, 403; 386/95, 121, 129, 130; H04N 5/70

(56) References Cited

U.S. PATENT DOCUMENTS

| | | | |
|---|---|---|---|
| 4,402,018 | * | 8/1983 | Wada et al. ........................... 358/346 |
| 4,688,105 | * | 8/1987 | Bloch et al. ........................... 358/335 |
| 4,709,277 | * | 11/1987 | Ninomiya et al. .................... 358/346 |
| 4,768,099 | | 8/1988 | Mukai . |
| 4,777,537 | * | 10/1988 | Ueno et al. ........................... 358/341 |
| 4,823,285 | * | 4/1989 | Blancato .............................. 348/552 |
| 4,888,648 | * | 12/1989 | Takeuchi et al. ..................... 358/335 |
| 4,974,096 | | 11/1990 | Wash . |
| 5,206,929 | * | 4/1993 | Langford et al. .................... 348/552 |
| 5,258,859 | | 11/1993 | Wada et al. . |

FOREIGN PATENT DOCUMENTS 3-274047   12/1991  (JP) .
4-70724    3/1992   (JP) .

* cited by examiner

*Primary Examiner*—Huy Nguyen
(74) *Attorney, Agent, or Firm*—Burns, Doane, Swecker & Mathis, LLP

(57) ABSTRACT

An electronic filing system which can record an image reproduced from a photographed image of a developed film together with a photographic information pertaining thereto on a recording medium such as an optical disk. The system includes a device for reproducing an image from the photographed image of the film, a reading device for reading the photographic information recorded on the film, and a writing device for writing the reproduced image and photographic information on the recording medium.

17 Claims, 46 Drawing Sheets

FIG. 7

| ALBUM TITLE | |
|---|---|
| WEDDING | '86.11.23 |
| HONEY-MOON (EUROPE) | '86.11.25 |
| SUMMER MOUNT CLIMBING | '87.07.24 |
| FLOWERS | '87.07.25 |
| CASTLE | '88.05.01 |
| DISNEYLAND | '88.09.15 |
| GUAM TRIP | '90.10.20 |
| MEGUMI | '89.01.11 |
| RIE | '91.12.15 |
| EUROPEAN COUNTRY | — — — |
| NATURE OF NORTH ALPS | — — — |
| CASTLE 100 IN JAPAN | — — — |

FIG. 19

```
************ALBUM   EDIT ************
           《《EDIT ALBUM》》←←←←《《INSERT ALBUM》》
       ┌WEDDING              '86.11.23   WEDDING              '86.11.23┐
101─   │HONEY-MOON(EUROPE)   '86.11.25   HONEY-MOON(EUROPE)   '86.11.25│
       │SUMMER MOUNT CLIMBING'87.07.24   SUMMER MOUNT CLIMBING'87.07.24│
       │FLOWERS              '87.07.25   FLOWERS              '87.07.25│
       │CASTLE               '88.05.01   CASTLE               '88.05.01│
       │DISNEYLAND           '88.09.15   DISNEYLAND           '88.09.15│
       │GUAM TRIP            '90.10.20   GUAM TRIP            '90.10.20│─104
103─   │MEGUMI               '89.01.11   MEGUMI               '89.01.11│
       │RIE                  '91.12.15   RIE                  '91.12.15│
       │EUROPEAN COUNTRY      – – –      EUROPEAN COUNTRY      – – –   │─102
       │NATURE OF NORTH ALPS  – – –      NATURE OF NORTH ALPS  – – –   │
       └CASTLE 100 IN JAPAN   – – –      CASTLE 100 IN JAPAN   – – –   ┘

105─ [FILM CARTRIDGE]
106─ [NEW ALBUM]
```

FIG. 20

```
                107
************ALBUM   EDIT ************

109─ 《《EDIT ALBUM   》》[ HONEY-MOON(EUROPE) ]      ┌─────────┐
     ┌01 02 03 04 05 06 07 08 09 10 11 12          │04       │
     │13 14 15 16 17 18 19 20 21 22 23 24          │         │─area1
111─ │25 26 27 28 29 30 31 32 33 34 35 36          │         │
     └37 38 39 40                                  └─────────┘

108─ 《《INSERT ALBUM》》[ EUROPEAN COUNTRY ]         ┌─────────┐
     ┌01 02 03 04 05 06 07 08 09 10 11 12          │10       │
112─ │13 14 15 16 17 18 19 20 21 22 23 24          │         │─area2
     └25 26 27 28 29 30                            │         │
                                                   └─────────┘
                          110
```

FIG. 39 o auto mode o semi auto mode o free mode select any one

FIG. 40 o put on next photograph o move to next page o restore this whole page again o layout finish select any one

FIG. 41 o really finish?

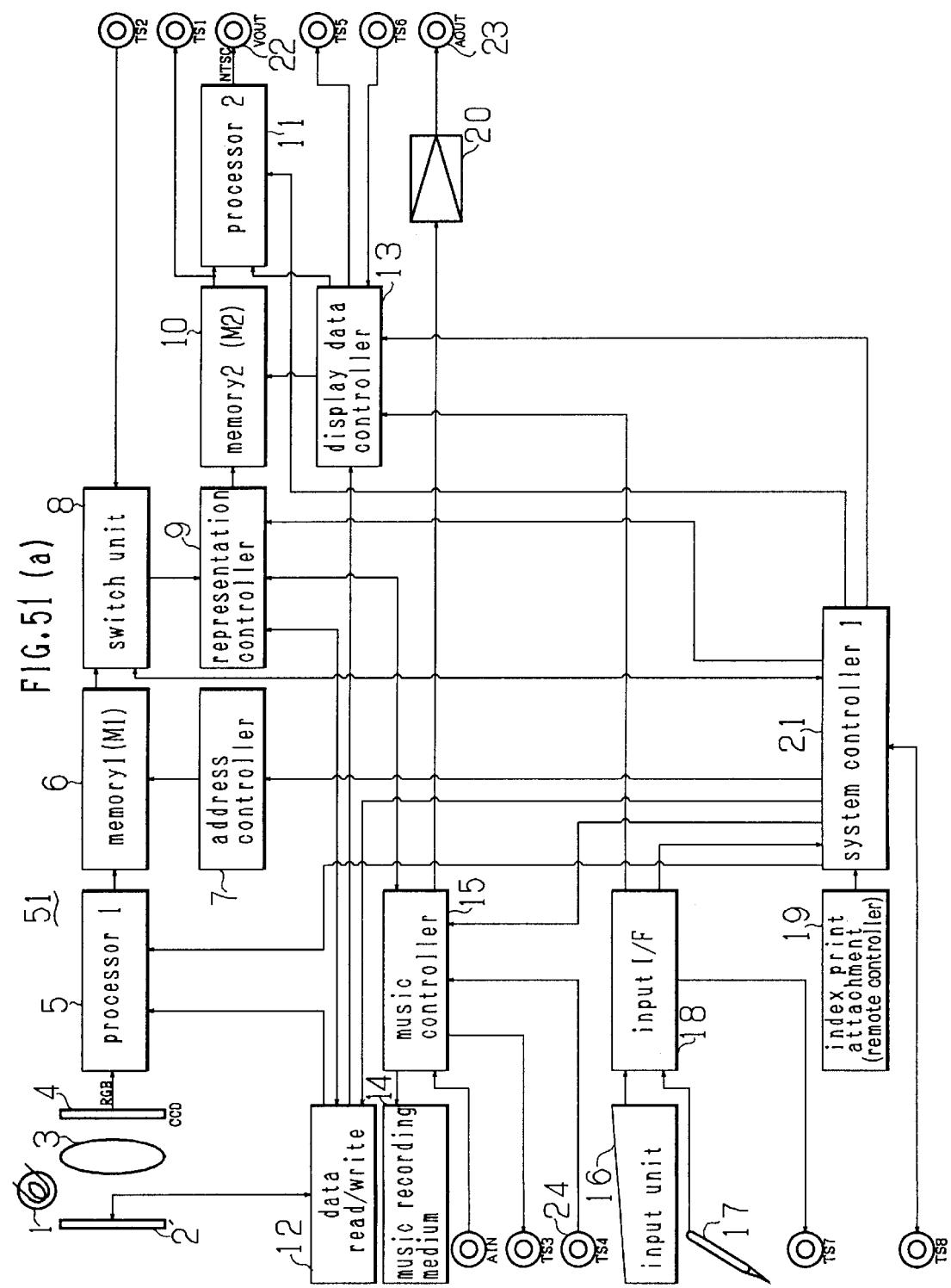

FIG. 55
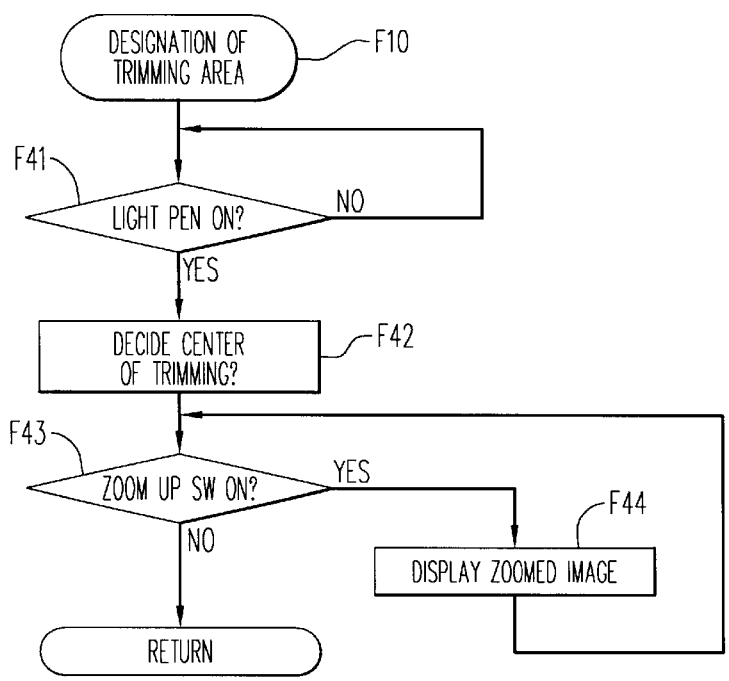
FIG. 56
| | HORIZONTAL COMPOSITION | VERTICAL COMPOSITION |
|---|---|---|
| E-SIZE | | |
| L-SIZE | | |
| PANORAMA SIZE | | |
FIG. 57
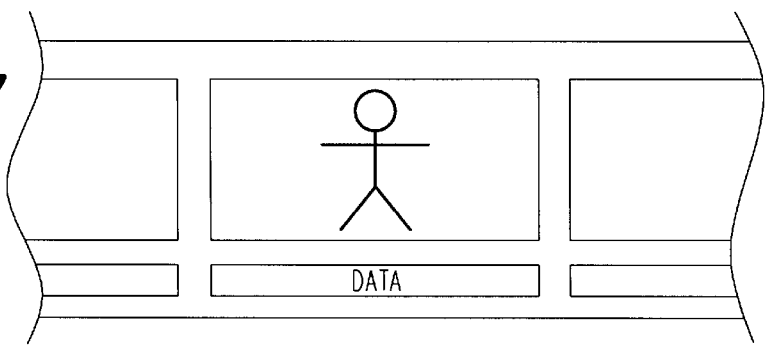

ELECTRONIC FILING SYSTEM CAPABLE OF RECORDING IMAGE REPRODUCED FROM DEVELOPED FILM

BACKGROUND OF THE INVENTION FROM PHOTOGRAPHIC IMAGE OF FILM

1. Field of the Invention

This invention relates to a system for filing image data electronically on a recording medium such as an optical disk, which can record an image signal reproduced from a photographed image on a film in company with a photographic information recorded thereon.

2. Description of Related Art

Camera systems are conventionally known wherein photographic information and film developing information and the like are recorded on a magnetic track provided on a film together with a photographed image, and also reproducing apparatus wherein a visual image is reproduced on a video display such as a monitor TV by use of the above information. Such systems are disclosed in U.S. Pat. No. 4,974,096. An image reproducing system is also known wherein photographed image on a film is converted into an image signal and the signal is recorded on an optical disk. Such a system is disclosed in U.S. Pat. No. 5,258,859.

There has been known an apparatus in which a photographed image on a film is printed in layout form on a photographic paper in accordance with photographic information, enabling an album to be produced. Such apparatus is disclosed in Japanese Laid-Open Patent No.3-274047.

Furthermore, a digital still video camera is known in which photographic information can be recorded together with a video image on an optical disk. Such a camera is disclosed in Japanese Laid-Open Patent No.4-70724. And, an image processing and filing apparatus is known in which image data is changed to a visual image by data processing, and the image data is stored on a recording medium. Such apparatus is disclosed in U.S. Pat. No. 4,768,099.

In in U.S. Pat. No. 4,974,096, there is no disclosure that a photographed image and photographic information on a film can be recorded on an independent recording medium. And, in U.S. Pat. No. 5,258,859, no system is disclosed wherein a photographic information can be recorded on an optical disk, editing and searching may be impossible. In the album print apparatus disclosed in Japanese Laid-Open Patent No.3-274047, the photographed image cannot be recorded on a recording medium.

Furthermore, in a camera disclosed in Japanese Laid-Open Patent No.4-70724, recording information on the optical disk is not a photographed image on a film, but an image picked up by the camera. In an apparatus disclosed in U.S. Pat. No. 4,768,099, data to be filed on the recording medium is not information recorded on a film.

In the case where many photographed images on a film and photographic information are to be recorded on an independent recording medium, it may be possible to edit and record them on an optical disk and the like. However, editing input means such as a keyboard may be used by an operator for inputting an item (key word) of searching. In this case, the edit operation becomes troublesome.

Additionally, in a conventional apparatus that enables an electronic album to be edited as above mentioned, images to be set in the album are restricted only to photographed images recorded on the film, and image data recorded previously is not used for producing the album. Accordingly, it is not possible to give the album variety.

SUMMARY OF THE INVENTION

It is an object of the present invention to provide an electronic filing system which can record photographed images on a film together with photographic information on an independent recording medium.

It is another object of the present invention to provide an electronic filing system in which troublesome inputting operations of searching for an item can be omitted, and optional photographed images on the film can be recorded at optional areas of the recording medium, so that an edit operation can be made easier.

It is a further object of the present invention to provide an electronic filing system in which searching by using recorded photographic information can be achieved.

In order to attain these objects, according to the present invention, there is provided an electronic filing system which comprises, film on which a photographed image and photographic information relating to the image are recorded; image reproducing means for reproducing an image from the photographed image recorded on the film; reading means for reading the photographic information recorded on the film; a recording medium capable of writing and reading a plurality of the images and the information; and writing means for writing the image reproduced by the image reproducing means and the photographic information read by the reading means on the recording medium.

In the system as above mentioned, since photographed images and photographic information corresponding to the images are recorded on developed film, at the same time when an image signal is reproduced, photographic information can be read out and recorded on a recording medium. As a result, an electronic album capable of being searched by using the recorded information as searching items can be obtained.

It is further object of the present invention to provide an image reproducing and recording system capable of making an electronic album which has a recording mode that can record an image recorded previously on a optical disk, so that the album may have a variety of images laid out thereon, and the user can enjoy making the album.

In order to attain this object, according to the present invention there is provided an electronic filing system capable of reproducing an image from a photographed image recorded on a film and recording the reproduced image on a recording medium, comprising, image reproducing means for reproducing an image from the photographed image recorded on the film; a recording medium capable of writing and reading a plurality of the images; first writing means for writing the image reproduced by the image reproducing means from the film on the recording medium; read out means for reading out the image written on the recording medium; second writing means for writing again the image read out by the read out means on the recording medium; and writing control means for controlling the first and second writing means so that the image reproduced by the image reproducing means and the image read out by the read out means may be written in connection with each other.

In the system as above mentioned, both of the image signal read from the recording medium and the image signal reproduced from the photographed image on the film can be recorded on the recording medium. Consequently, if a plurality of layout patterns are previously recorded on the recording medium, it makes it easy to edit the album, and if a landscape is previously recorded, it is possible to compose or insert the landscape into the photographed image of the film, so that the user can make an album having variety, and take pleasure in the album.

BRIEF DESCRIPTION OF THE DRAWINGS

FIG. 7 is a diagram showing contents of an album;

FIG. 19 is a diagram showing a display of an album edit;

FIG. 20 is a diagram showing a display of an album edit;

FIG. 39 is a diagram showing a display of a message;

FIG. 40 is a diagram showing a display of a message;

FIG. 41 is a diagram showing a display of a message;

FIG. 55 is a flow chart illustrating a trimming area designation routine;

FIG. 56 is a diagram showing screen frames;

FIG. 57 is a diagram showing a film.

DESCRIPTION OF PREFERRED EMBODIMENT

Figure 1:
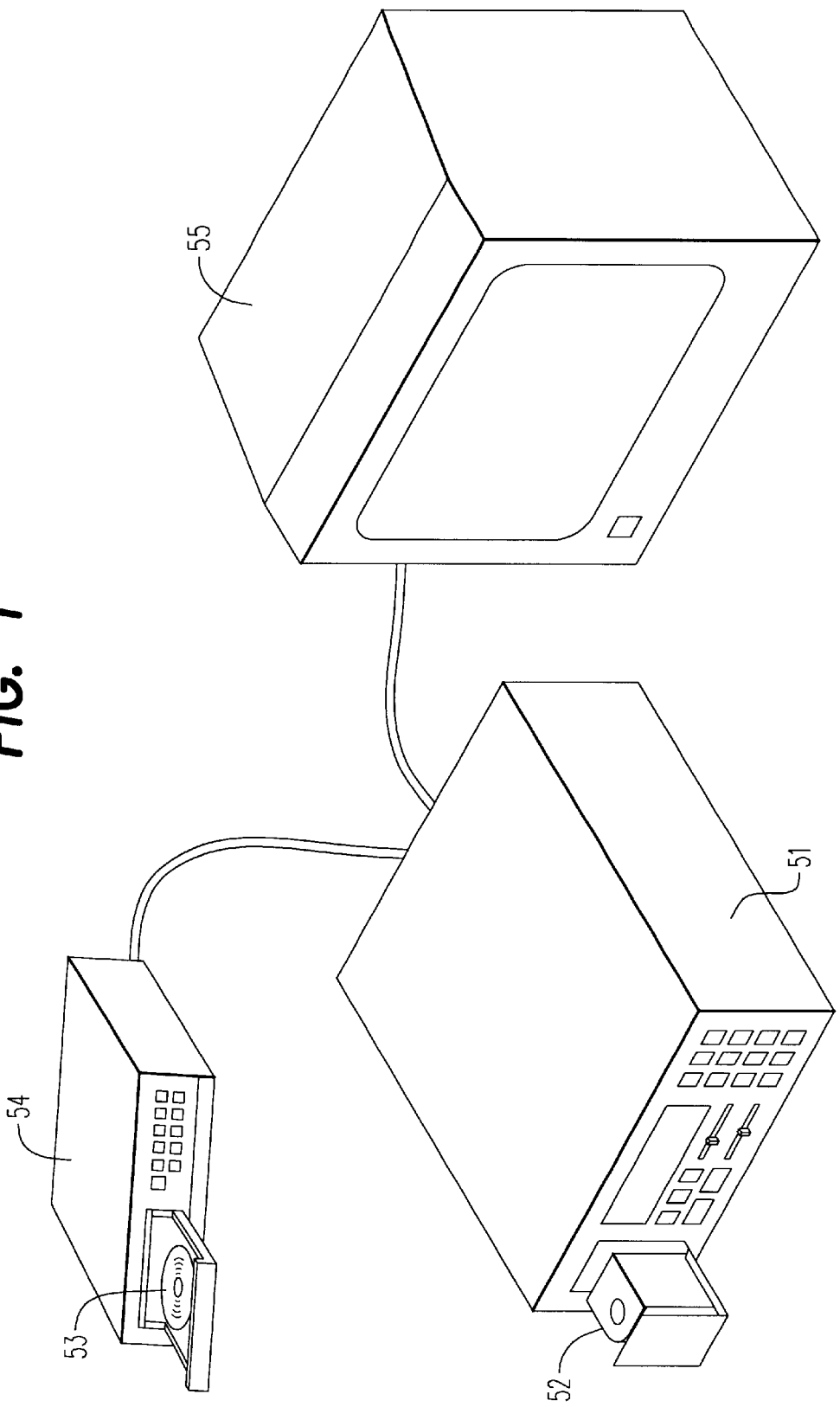
FIG. 1 is a schematic view showing an electronic filing system embodying the present invention.

A preferred embodiment of the present invention will be described referring to the accompanying drawings. FIG. 1 is an external view of an electronic filing system showing the embodiment of the present invention. The filing system comprises a film player 51 having a film cartridge 52 loaded therein, which contains a developed photographic film, for reproducing an image signal from a photographed image of a developed film and also, reading/writing photographic information (data) recorded on the film, an electronic album apparatus 54 having an optical disk 53 (called an electronic album), e.g. a mini-disk (MD), loaded therein and arranged responsive to the output of the film player 51 for recording and reproducing an image and corresponding speech or music on the electronic album 53, and a monitor 55 incorporating a CRT for displaying an image with corresponding sounds supplied from the film player 51 or the electronic album apparatus 54.

Figure 2A:
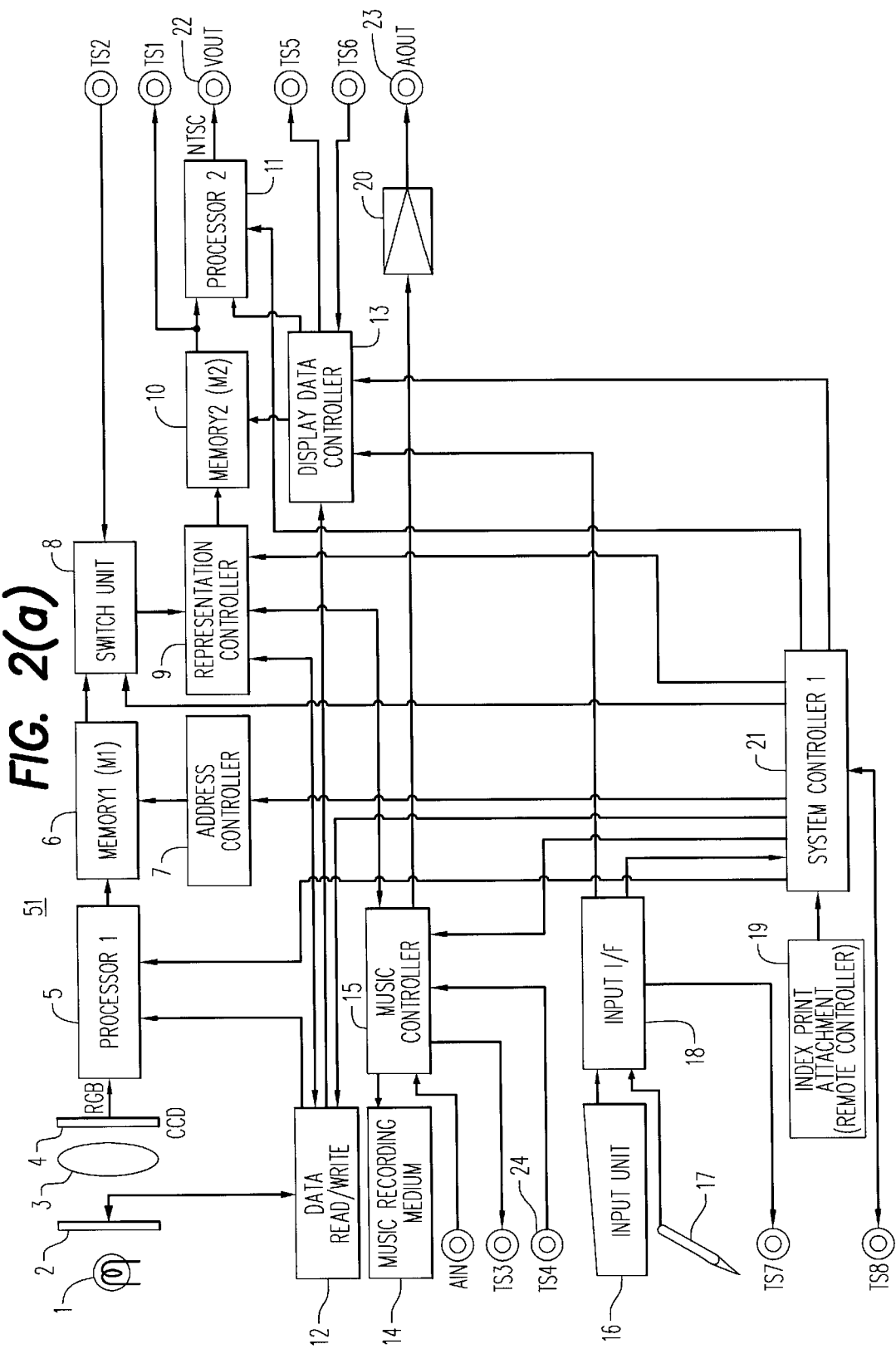
FIGS. 2(a) and 2(b) are block diagrams showing a construction of the system.
Figure 2:
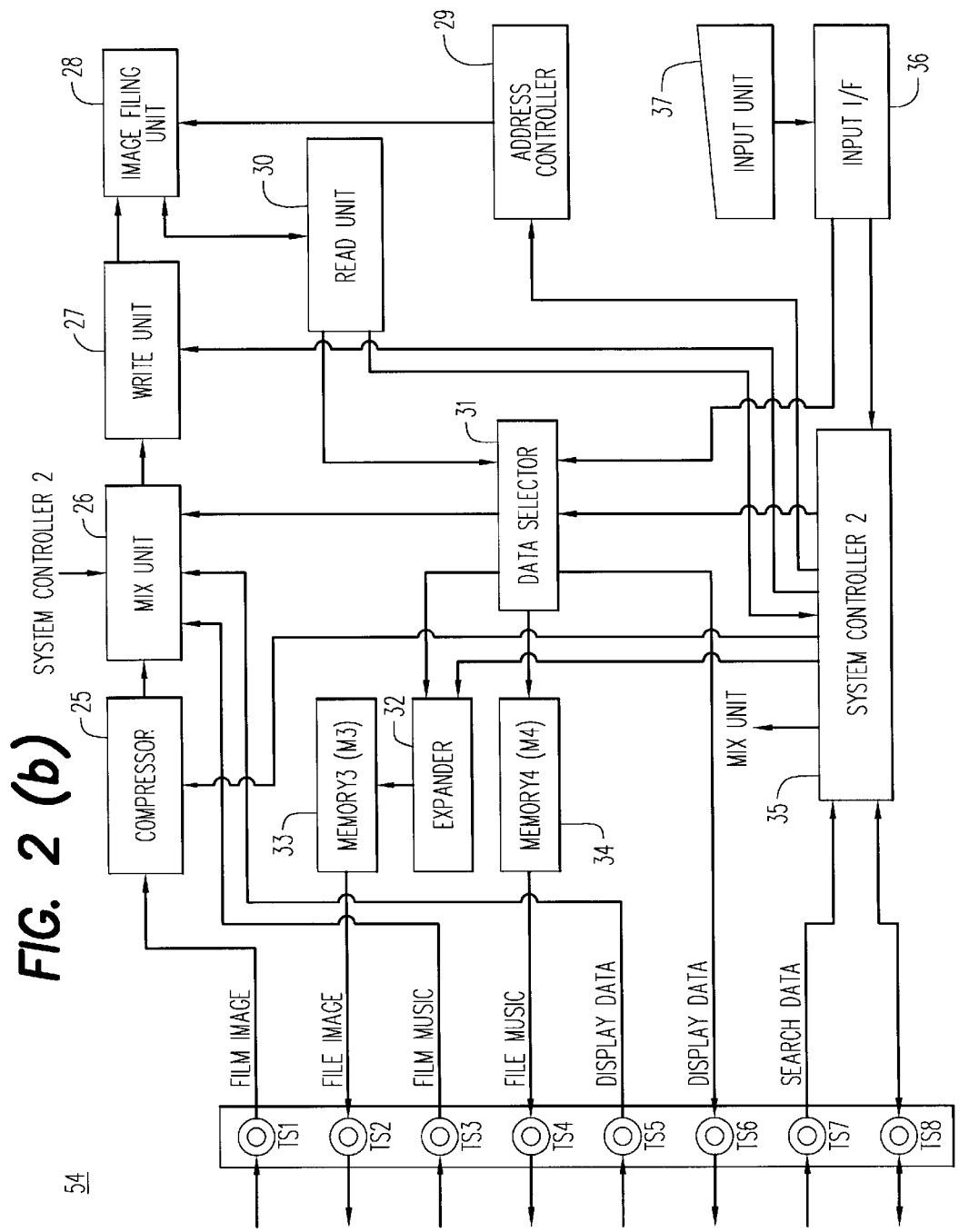

FIGS. 2(a) and 2(b) are block diagrams showing a combination of internal arrangements of the film player 51 and the electronic album apparatus 54. As shown, a light source 1 in the film player 51 is a strobe or halogen lamp which emits a beam of light towards a developed film 2 loaded in the player. As the film 2 is illuminated by the light beam of the light source 1, its frame image is projected by an optical device 3 on an imaging device 4 (referred to as CCD hereinafter). The film image is converted by the CCD 4 to an RGB signal (reproduced image signal) which is transferred to a first processor 5 for processing. A resultant processed signal from the processor 5 is then stored in a first memory 6 (M1) whose addressing is controlled by an address controller 7. A switch unit 8 selects between an image stored in the first memory 6 and an image stored in the electronic album 53 and transmits a selected image to a representation controller 9. The representation controller 9 is capable of sizing the image stored in the first memory 6 (e.g. by zooming or panning) and rearranging it by composition, insertion, or superimposing with a graphic image(s) recorded in the electronic album 53. Such composition, insertion, and superimposing actions will be explained later in more detail.

A second memory 10 (M2) temporarily stores a rearranged image produced by the representation controller 9 for display. A second processor 11 converts the image stored in the second memory 10 into a TV signal of e.g. the NTSC format which is then delivered from a video output terminal 22 to the display monitor 55. A data read/write unit 12 (referred to as R/W unit hereinafter) reads photographic information recorded on the film 2 (e.g. the information as shown in Japanese Patent KOUHYOU KOUHOU NO.4-501490) for distribution to the first processor 5, the representation controller 9, and a display data controller 13 and saves a processing method for each frame determined by the representation controller 9. The display data controller 13 is adapted to superimpose an input data fed from an input unit 16 and the photographic information read out by the R/W unit 12 together with the reproduced image signal and to display a display data (e.g. with a pointer) received from the electronic album 53 which is loaded in an image filing unit 28.

A music recording medium 14 holds a speech or music data to be reproduced along with its corresponding image and may be a semiconductor memory installed in the film player 51 or a music tape playable on a separate playback apparatus. A music controller 15 processes music data reproduced from the music recording medium 14 or directly fed from an audio input terminal 24 and transmits it to amplifier 20. The music controller 15 is connected to the representation controller 9 so that the processing of the music data is synchronized with the processing of the corresponding image. The input unit 16 may be a keyboard or mouse for entry of frame number to be processed. Also, a light pen 17 is provided for determining the location of input image data on a screen and capturing a desired object in the image to be processed. Both the input unit 16 and the light pen 17 are coupled to an input interface 18 (referred to as input I/F hereinafter). A index print attachment (remote controller) 19 is loaded with an index print for selecting and determining a frame number, a mode, and a record (file). The foregoing actions in the film player 51 are integrally controlled by a first system controller 21 which communicates with a second system controller 35 of the electronic album apparatus 54 for data exchange.

FIG. 57 illustrates photographed images on a developed film and their associated magnetic recording tracks where corresponding photographic information is stored. The arrangement of such an image frame and its corresponding recording track in combination is disclosed in Japanese Patent KOUHYOU KOUHOU No.4-501490.

The electronic album apparatus 54 has a data compressor 25 for compressing the data of an image supplied from the film player 51. A MIX unit 26 receives and combines the image data, music data, and photographic information attributes together to produce recording data which is then supplied to a write unit 27 for storage. An image filing unit 28 is arranged into which the electronic album 53 of an optical recording disk is loaded for recording and reproducing of the composite data. The electronic album 53 holds factory installed or specific image data as well as the film images supplied from the film player 51. The specific image data can be used in the image processing as will be described later in detail. The address of the image filing unit 28 is accessed by an address controller 29. The reproduction of composite data from the image filing unit 28 is performed by a read unit 30.

The composite data read by the read unit 30 is transferred to a data selector 31 where it is divided into the image data, the music data, and the display data. The image data is expanded by a data expander 32 and temporarily stored in a third memory 33 (M3). The music data is stored in a fourth memory 34 (M4). An input unit 37 of the electronic album apparatus 54 is coupled via an input interface 36 to the second system controller 35.

There are provided a plurality of terminals, TS1 for transmitting image data from the second memory 10 (M2) to the data compression unit 25, TS2 for transferring image data from the third memory 33 (M3) to the switch unit 8, TS3 for transmitting music data from the music controller 15 to the MIX unit 26, TS4 for transferring music data from the fourth memory 34 (M4) to the music controller 15, TS5 for transmitting display data from the display data controller 13 to the MIX unit 26, TS6 for transferring display data from the data selector 31 to the display data controller 13, TS7 for transmitting search data or retrieving commands from the input interface 18 of the film player 51 to the second system controller 35, and TS8 for exchanging data between the first system controller 21 and the second system controller 35.

The actions of the arrangement shown in FIGS. 2(a)(b) will be explained in more detail. A film image projected by the light source 1 on to the CCD 4 is converted into an RGB signal which is then fed to the first processor 5. At the first processor 5, the RGB signal is A/D converted and matrix processed using a relevant attribute data read out by the R/W unit 12, before being stored temporarily in the first memory 6. The image data stored in the first memory 6 is accessed by the address controller 7 and transferred to the switch unit 8. For reproduction and display of the film image, the first system controller 21 actuates the switch unit 8 to pass the image data of the first memory 6 to the representation controller 9. In the representation controller 9, the image data is processed by zooming, panning, rotation, filtering, and other applicable techniques and added with other image data from the electronic album apparatus 54 by composition, insertion, and superimposing to produce a composite image which is then transferred to the second memory 10. The composite image data of the second memory 10 is converted by the second processor 11 to an NTSC signal and transmitted via the video output terminal 22 to the monitor 55 for display. At the same time, the attribute data including the date and the frame number read out by the R/W unit 12 is superimposed for displaying on the composite image by the display data controller 13.

For filing the film image, the image data stored in the second memory 10 are transferred via the terminal TS1 to the data compression unit 25 of the electronic album apparatus 54. The compressed output of the data compression unit 25 is added by the MIX unit 26 with its attribute data read out by the R/W unit 12 and a resultant composite data is fed to the write unit 27 for storage in the image filing unit 28.

The reading of image data from the image filing unit 28 will now be explained. The image data of the image filing unit 28 is read out by the read unit 30 and transferred to the data selector 31. The image data specified by the data selector 31 is data expanded by the data expander unit 32 and temporarily stored in the third memory 33. The image data of the third memory 33 is transferred via the terminal TS2 to the switch unit 8 of the film player 51. For reproduction of the image data from the terminal TS2 of the electronic album apparatus 54, the first system controller 21 actuates the switch unit 8 to pass it to the representation controller 9. The action after the representation controller 9 is identical to that for the film image.

Corresponding music data processed by the music controller 15 is reproduced synchronism with the image display and recorded via the terminal TS3 on the electronic album apparatus 54 corresponding to the image data. When reproduced from the image filing unit 28, the music data is selected by the data selector 31, temporarily stored in the fourth memory 34, and transmitted via the terminal TS4 to the music controller 15 for playback. Similarly, the attribute data such as the date is read out by the R/W unit 12 and superimposed for display on the image data by the second processor 11 being controlled by the display data controller 13. This attribute data for display can also be transmitted via the terminal TS5 to the electronic album apparatus 54 for filing. The display data may be used for searching its image data. The display data reproduced and fed from the terminal TS6 of the electronic album apparatus 54 is input to the display data controller 13 and its character data such as a date is transmitted to the second processor 11 while its display frame data is recorded in the second memory 10. Entry data from the input unit 16 can also be processed in the same manner.

For searching the image data, a searching request data is fed via the terminal TS7 to the second system controller which actuates the address controller 29 to access the image filing unit 28 for searching the image data.

Figure 3:
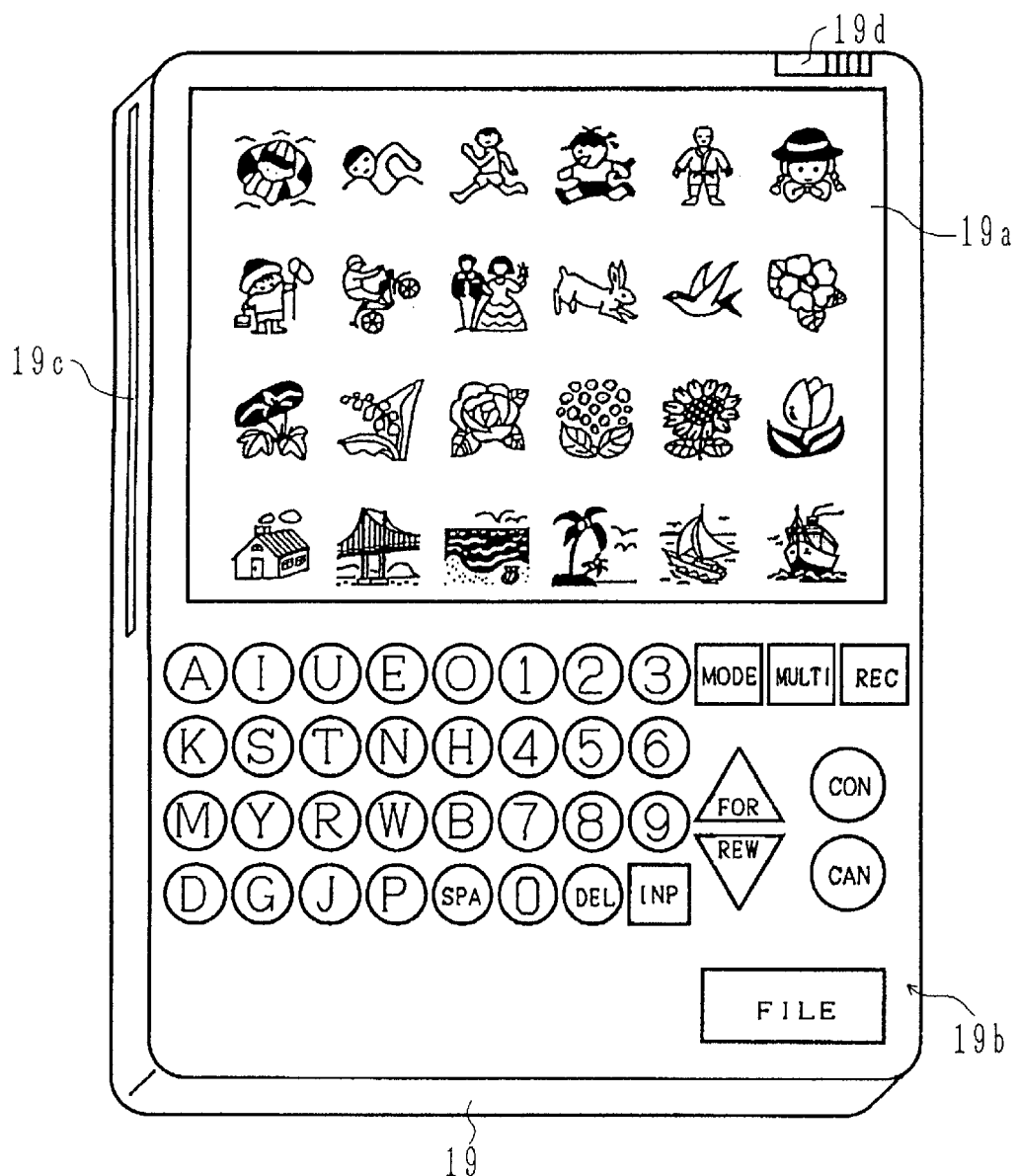
FIG. 3 is a perspective view of a remote controller.

The index print attachment (remote controller) 19 will be explained in more detail referring to FIG. 3. The remote controller 19 comprises a transparent touch panel 19a and a key switch board 19b for producing commands to display a desired image on the monitor 55 and record it on a disk loaded in the image filing device 28. Index prints of a film cartridge are inserted from an index print loading opening 19c provided in the side of the controller 19 and are visible through the touch panel 19a, each frame position of the index prints is constructed as a touch switch, then any frame can be selected by touching it on the touch panel 19a. The key switch board 19b carries "alphanumeric" keys for making a caption or selecting a frame number, "entry" and "delete" keys for determining and deleting the caption or the frame number, a "mode" key for selecting playback or recording action, and selecting between film image and file image, "multi-image" and "whole record" keys for selecting a disk recording mode, "frame forward" and "frame rewind" keys for advancing and rewinding the film, and for rolling up and down text on the display screen and for selecting a filed image, "confirm" and "cancel" keys for confirming and canceling the selected mode or frame, and a "file" key for starting a disk recording action. The remote controller 19 also has an unloading lever 19d for unloading the index print and a signal output section arranged at the front end (upper end in FIG. 3) thereof for communication with the film player 51.

Figure 4:
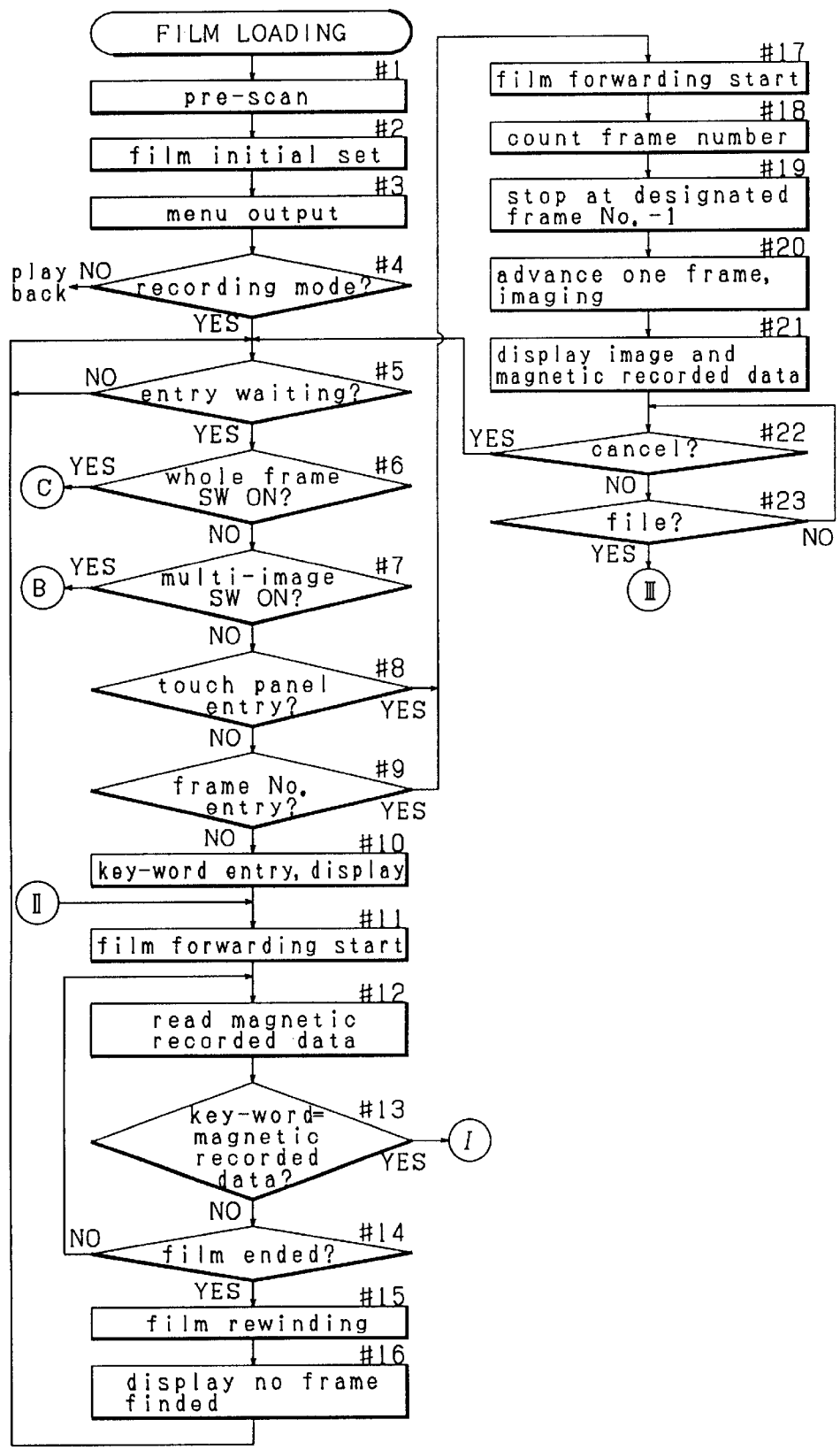
FIGS. 4(a)–4(b) are flow charts illustrating a film loading routine for the system.
Figure 4:
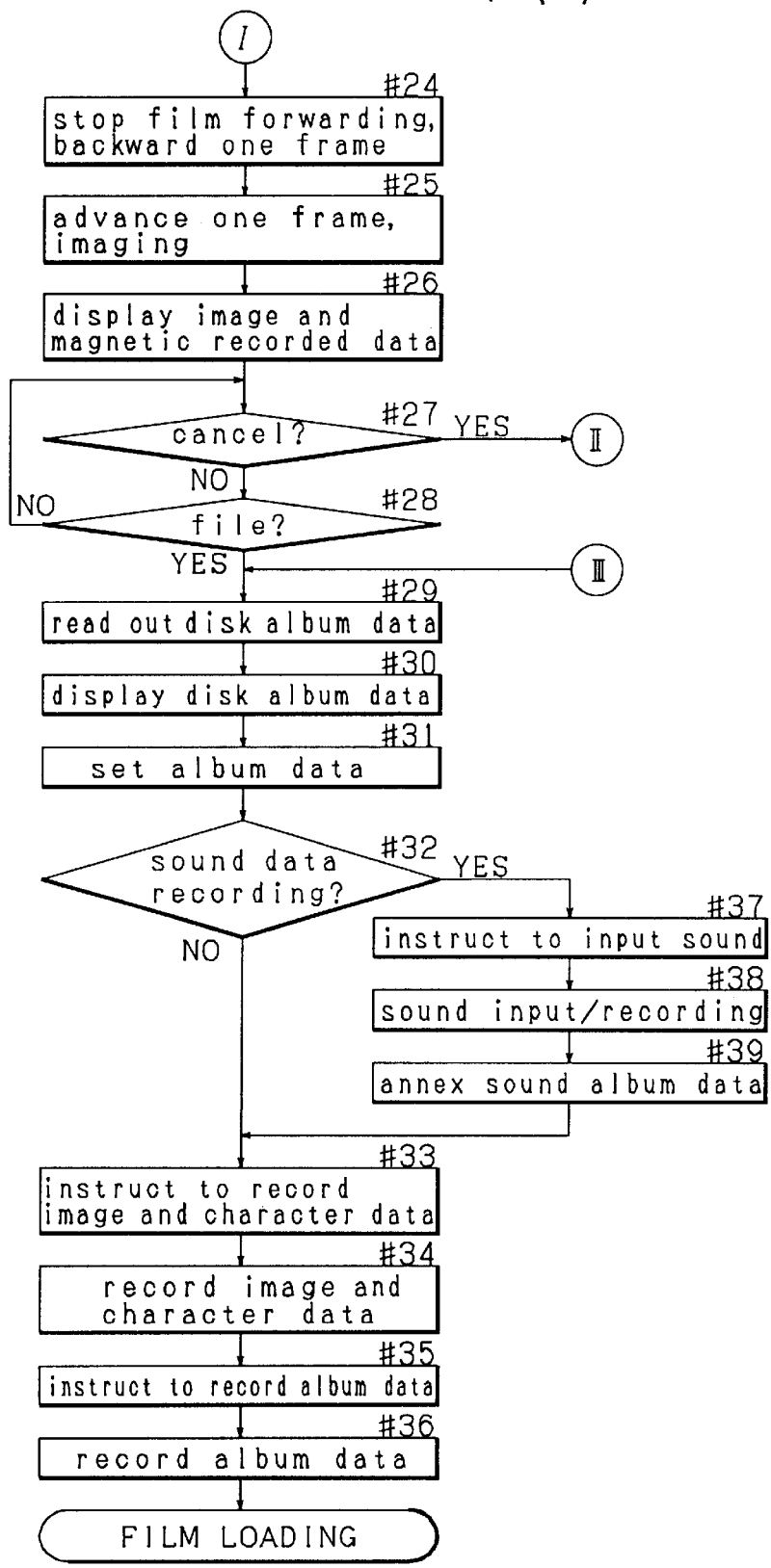

The action of the film player 51 with the film cartridge 52 loaded therein will be described referring to a flow chart shown in FIGS. 4(a)(b). The action starts with pre-scanning (Step #1) in which the magnetically recorded data for all frames on a film is read out and stored in the memory. The film is advanced to an initial frame which can be reproduced (Step #2) and the display shows a menu for determining the playback or recording action with the mode key (Step #3). If the playback mode is selected (NO at Step #4), the reproduction starts. If the recording mode is selected and the waiting for command entry is requested, the procedure moves to a sequence of steps executed by the "whole record" key and "multi-image" key operations, touch panel contacts, and frame number entries with the remote controller 19 (Steps #5 to #9). If no such steps are executed and a key word for searching of a desired frame is entered, the signal is transmitted to the film player 51 from the remote controller 19, and the monitor 55 displays the key word (Step #10). Then, the film is fast forwarded until magnetically recorded data defined by the key word is found (Steps #11 to #13). When the key word data is found, the film stops its forward movement and moves backward by one frame (Step #24). The film is then advanced one frame at a slow speed and the resultant frame image defined by the key word is reproduced (imaged) by the CCD 4 (Step #25) and displayed on the monitor 55 together with its attribute data (Step #26). At Steps #11 to #13, if a frame specified by the key word is not found and the film runs up to its end, the monitor 55 displays no existence of the frame after the rewinding of the film to the initial location at loading (Steps #14 to 16) and the procedure moves back to Step #5. After Step #26, the frame on the display is confirmed by the operator. When the "cancel" key is pressed (YES at Step #27), the procedure moves to Step #11 for repeating the search of another frame associated with the key word. If the "file" key is pressed (YES at Step #28), the procedure goes to Step #29 which will be described later.

When a desired frame is designated by touch panel contacts or entry of its number at Steps #8 and #9, the film is advanced to the frame (Steps #17 to #19) and the frame image is reproduced (imaging) by the CCD 4 (Step #20). The reproduced image of the frame is displayed on the monitor 55 together with its attribute data which have been stored in the memory (Step #21). When the operator confirms the frame and presses the "cancel" key (YES at Step #22), the procedure go back to Step #5. When the file key is pressed (YES at Step #23), the procedure moves to Step #29 where a list of album data is read out from the disk 53 and displayed on the monitor 55 (Step #30). An example of this album data list is illustrated in FIG. 7. The single disk can hold a plurality of themes (twelve in this embodiment) as the album data, and each theme is represented by titles to which images to be recorded are grouped. Then, the frame to be recorded is set to a desired title (Step #31). The set is carried out by moving the cursor to the desired title on the display screen with the "forward" and "rewind" keys of the remote controller 19 and clicking it, as shown in FIG. 7. The title list can also be used for playback of a desired title group of frame image data.

When desired, speech or sound is selected at a sequence of Steps #32, #37, #38, and #39, the sound input mode is selected on a screen of the monitor 55, and sound data is input to record on the disk. Further, sound album data including identification data which indicates the speech or sound data and the frame is annexed. The identification data may be annexed to the front of a speech or sound data or anywhere provided that the speech or sound corresponds with the picture frame. At Steps #33 to #36, an image and character data, such as a comment, are output to the electronic album apparatus 54 for recording and also the album data (or title set at Step #31) is output for recording. Thereafter, the procedure moves back to the start step.

Figure 5:
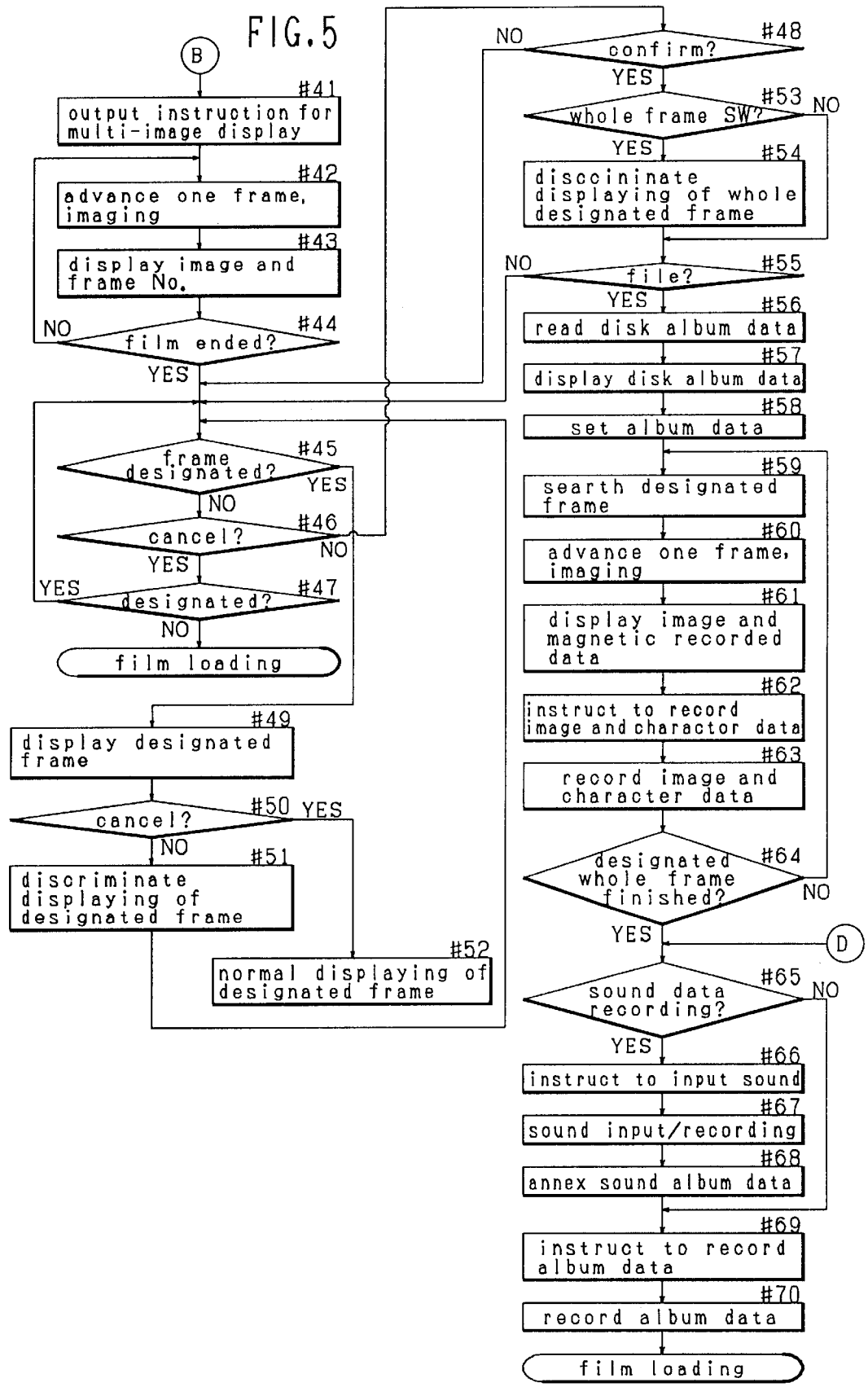
FIG. 5 is a flow chart illustrating a routine of a multi-screen display.
Figure 8:
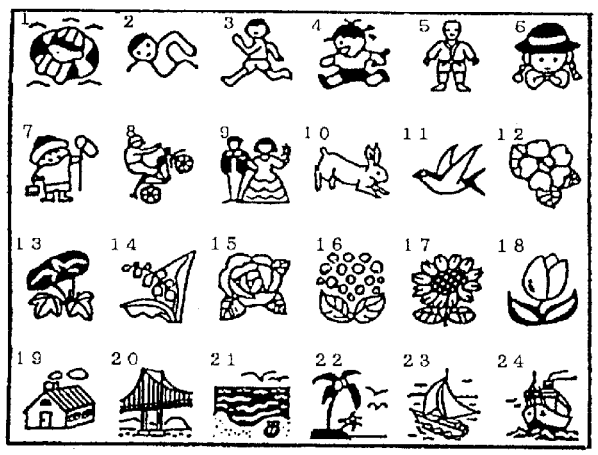
FIG. 8 is a diagram showing a display image.
Figure 9:
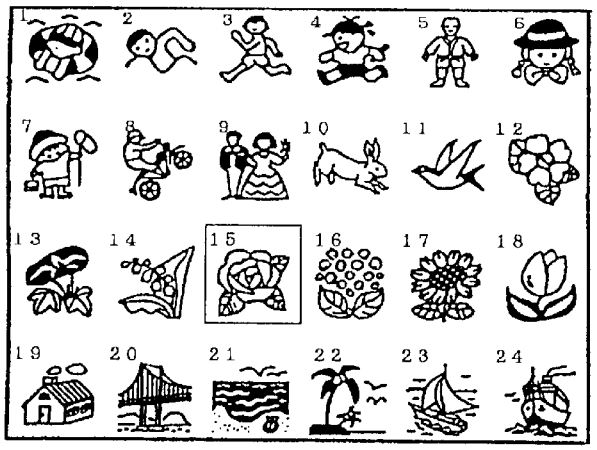
FIG. 9 is a diagram showing a display image.

If the "multi-image" key is pressed at Step #7, the procedure goes to a subroutine shown in FIG. 5. It starts with output of an instruction for multi-image display to the representation controller 9 (Step #41). Each of the image frames is projected to reproduce (image), and displayed on the monitor 55. The imaging may be of low resolution for preview of the image frames. This action is repeated to the end of the film to be processed. The representation controller 9 stores a series of image frames in the second memory 10. After completion of recording the entire image frames of the film, the monitor 55 displays the entire image frames of the film as shown in FIG. 8 (Steps #42 to #44). When a desired frame is designated (YES at Step #45), its image is marked on the monitor 55 as shown in FIG. 9 (Step #49). FIG. 9 shows the fifteenth image frame is designated by a pointer. Although the pointer is a square frame, it may be of any shape. The designation of the frame is by entry of its number, touch panel contacts, or cursor entry on the display. If the "cancel" key is pressed as reviewed, the screen is returned to the display shown in FIG. 8. When the "confirm" key is pressed, the image frame is discriminated by visual emphasization (Steps #50 to #52) and the procedure goes back to Step #45. The visual emphasization may be implemented by using the pointer of a bold line or increasing the brightness of the image frame. The number of the frame confirmed is stored in an unshown memory of the system controller 21.

When the "cancel" key is pressed without designation of the frame (NO at Step #45, YES at Step #46, and NO at Step #47), the procedure returns to the start step. If at least one frame has been designated, the "cancel" key is disabled and it is examined at Step #45 whether any other frame is designated or not. If the "confirm" key is not pressed with the above steps having been executed (NO at Step #48), the procedure moves back to Step #45 and the designation of further frames is enabled until the "confirm" key is pressed. When the "confirm" key is pressed, it is examined whether the "whole record" key is pressed or not (Step #53). When the "whole record" key is pressed, all the designated frames are displayed (Step #54). If not, the procedure skips to Step #54 and it is examined whether the "file" key is pressed or not (Step #55). When the "file" key is pressed, the album data is read out from the disk and displayed on the monitor 55. Then, the designated frames can be assigned to respective titles of the album data for classification (Steps #56 to #58).

Figure 10:
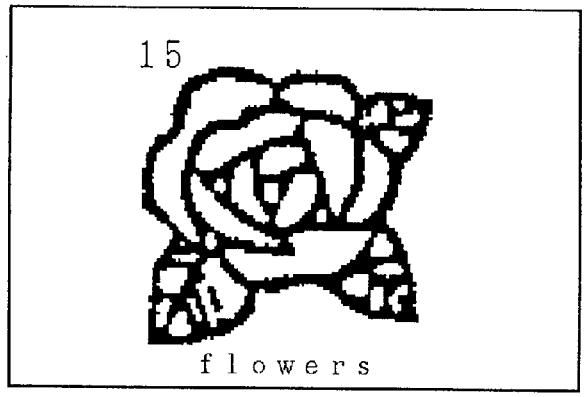
FIG. 10 is a diagram showing a display image.

In a sequence of Steps #59 to #63, the designated frame data is searched using its frame number stored previously, and displayed again on the monitor 55 together with the magnetically recorded attribute data. And then, the image data and information (character data) are output to the electronic album apparatus 54 for searching. Throughout the steps, the image frame and its character data are kept displayed on the monitor 55 as shown in FIG. 10. Those steps are repeated until all the designated frames and their attribute data are reproduced, displayed, and stored. At Steps #65 to #70, its audio sound is processed and stored. The steps are similar to those of the previously explained procedure. Finally, the album data classifying the image frames set at a Step #8 is stored on the disk of the image filing unit 28.

Figure 6:
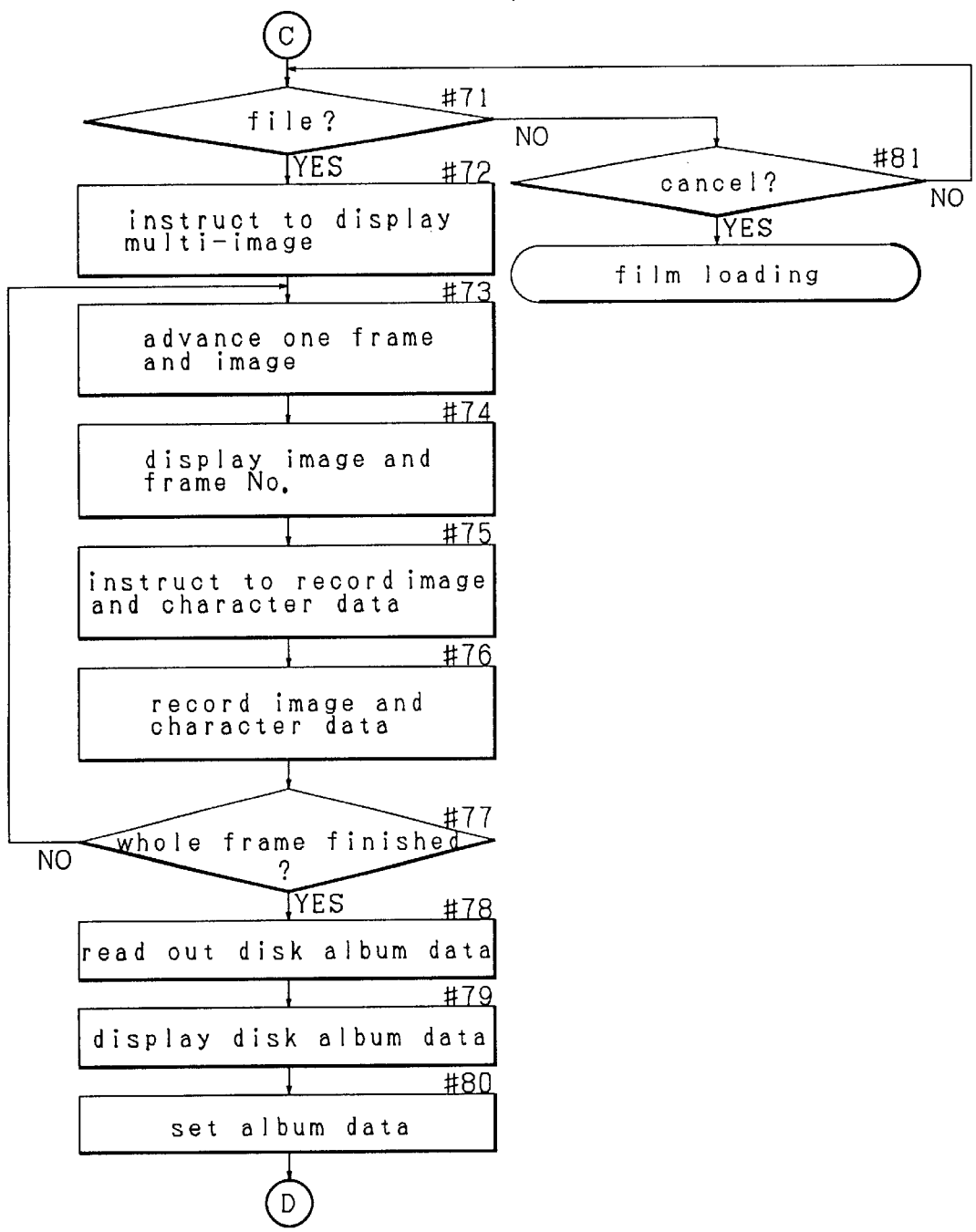
FIG. 6 is a flow chart illustrating a routine of a whole record display.

When the "whole record" key is pressed at Step #6, the procedure moves to a subroutine shown in FIG. 6. If the "file" key is pressed (YES at Step #71), an instruction for multi-image display is applied to the representation controller 9 (Step #72). After the frames are then projected to reproduced one by one, they are displayed on the monitor 55 and transferred to the electronic album apparatus 54 simultaneously. The output data from the second memory 10 to the monitor 55 is in a multi-image format but the data to the electronic album apparatus 54 is a single screen image. Those actions are repeated until the total frames are processed and stored (Steps #73 to #77). Finally, the album data are read out from the disk of the image filing unit 28, of which corresponding titles are labeled to the frames and their magnetically recorded attribute data for classification and identification. After selecting which album is to be recorded the album data of the frames and their text data are recorded to the selected album on to the disk (Steps #78 to #80) and the procedure goes to Step #65. If the "file" key is not pressed but the "cancel" key is pressed at Step #71, the procedure moves back to the start step.

The album edit function of the system will now be explained. The album edit action includes interposing of desired frames of an album group on a disk between the frames of the film cartridge or of the other album group and changing an order of the recorded frames. It is assumed that the album data containing the frames to be inserted is termed an insert album and the album data into which the frames are inserted is called an edit album. There are three different variations of the edit action; inserting each frame of the (insert) album B in the image filing unit 28 into another (edit) album A, interposing each frame of the (insert) album B in the image filing unit 28 between the frames of a film cartridge to produce a new album C, and changing the order of the frames of the (insert) album B in the image filing unit 28 to produce a new order of the frames which thus constitute another album C.

Figure 21:
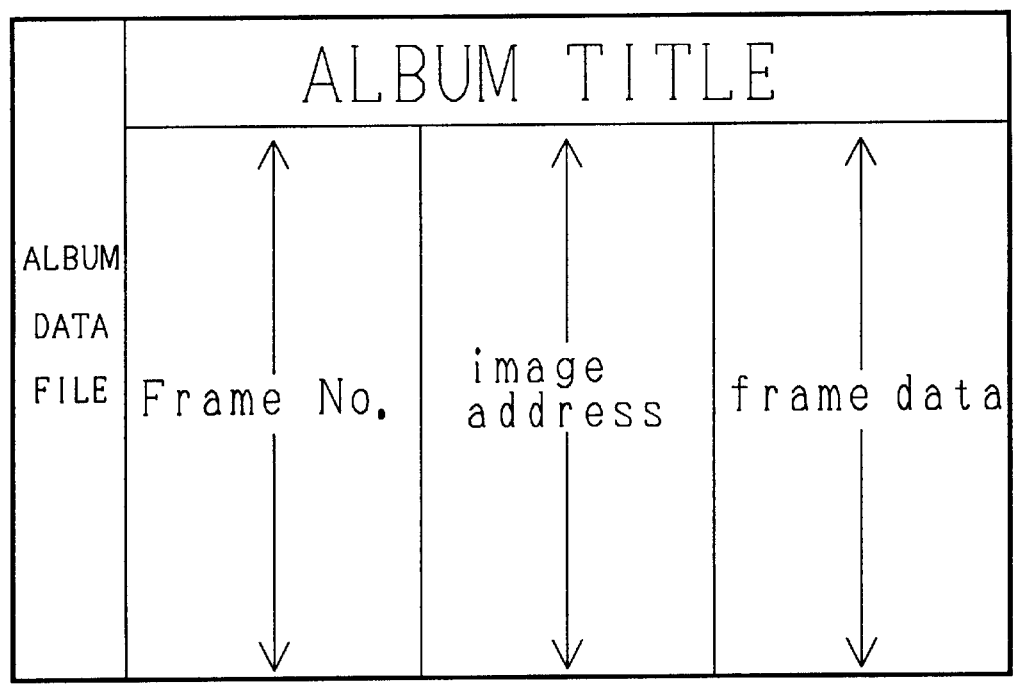
FIG. 21 is a diagram showing an album data file.

Each album comprises an album data file and an image file which are stored in the image filing unit 28. The album data file of filing data contains an album title, frame numbers, frame address data, and other specific data, as shown in FIG. 21. Accordingly, a new album can be defined by only the album data file. More specifically, a new album is established as specified with its album data file without copying and transferring the entire image data, whereby the size of memories and the time consumption for producing a new album will be minimized.

Figure 11:
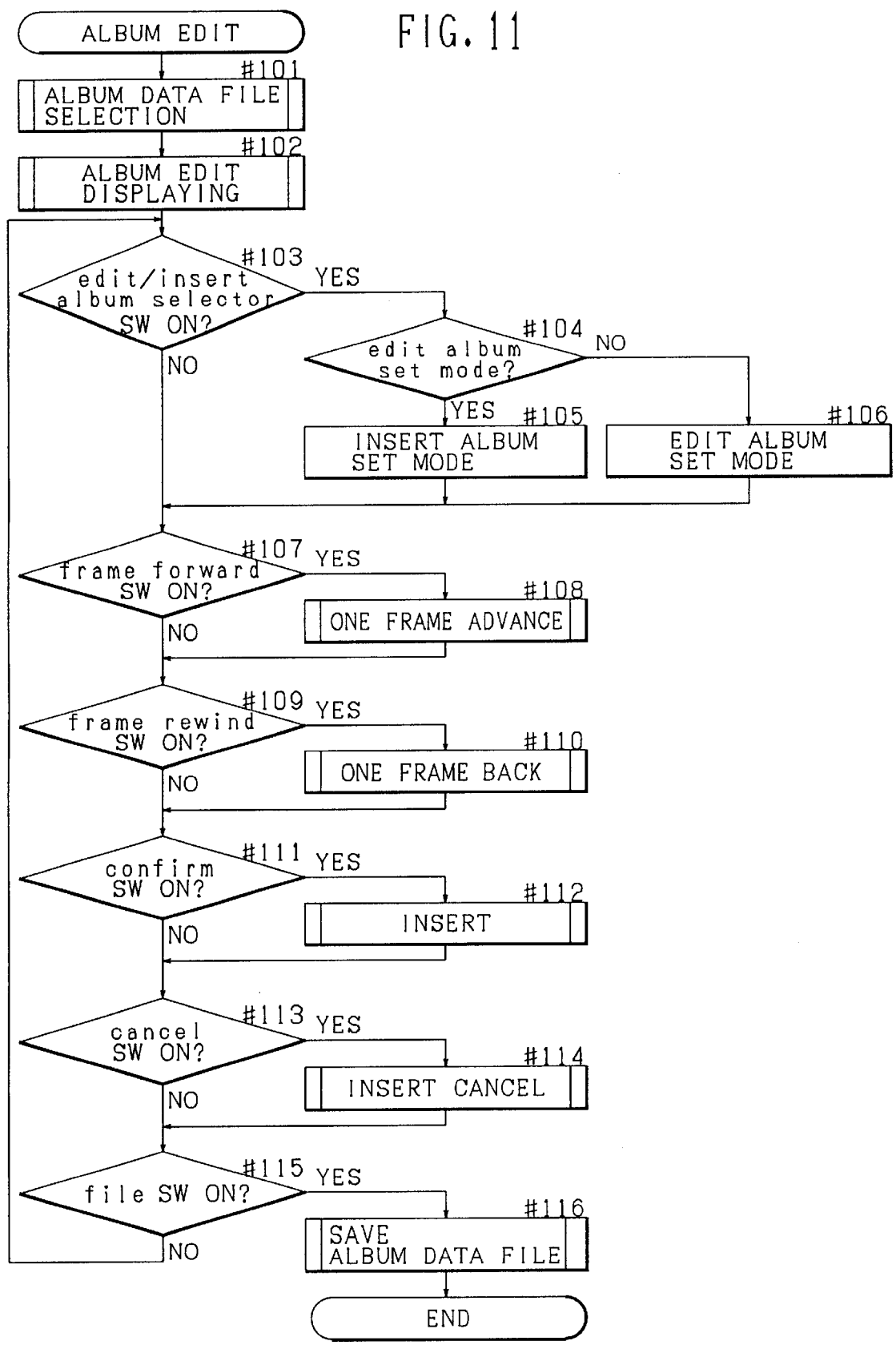
FIG. 11 is a flow chart illustrating an album edit routine.

The album edit action will be explained in more detail referring to the relevant flow charts. FIG. 11 illustrates a flow chart of the primary steps of the album edit action. It starts with selecting an edit album, an insert album, and a film cartridge to be used from a list of the album data files displayed on the monitor 55 (Step #101). An example of the list of the album data files is shown in FIG. 19 and will be explained later in more detail. Then, a screen for the edit and insert actions is displayed (Step #102) as shown in FIG. 20 which will also be described later. It is checked whether an edit/insert selector switch is turned on or not with the input unit 37 of the electronic album apparatus 54 (Step #103). If yes, the mode is shifted from the edit album setting mode (where the edit album cursor 109 shown in FIG. 20 blinks) to the insert album setting mode (where the insert album cursor 110 shown in FIG. 20 blinks) or vice versa (Steps #104 to #106).

It is then checked for the "forward" key (switch), "rewind" key, "confirm" key, "cancel" key, and "file" key in a sequence (Steps #107 to #115). When the "forward" or "rewind" key is turned on, the cursor is moved forward or backward by one frame (Step #108 and #110). By moving the blinking cursor forward or backward, a desired frame to be inserted and a location for the insertion can be determined. When the "confirm" key is pressed, the frame of an insert album is inserted into the location in an edit album (Step #112). If the "cancel" key is turned on, a preceding frame before the cursor location frame in the edit album is deleted (Step #114). When the "file" key is pressed, the album data file containing the edit album amended and displayed on the screen is saved in the image filing unit 28 (Step #116) and the album edit action is finished.

Figure 12:
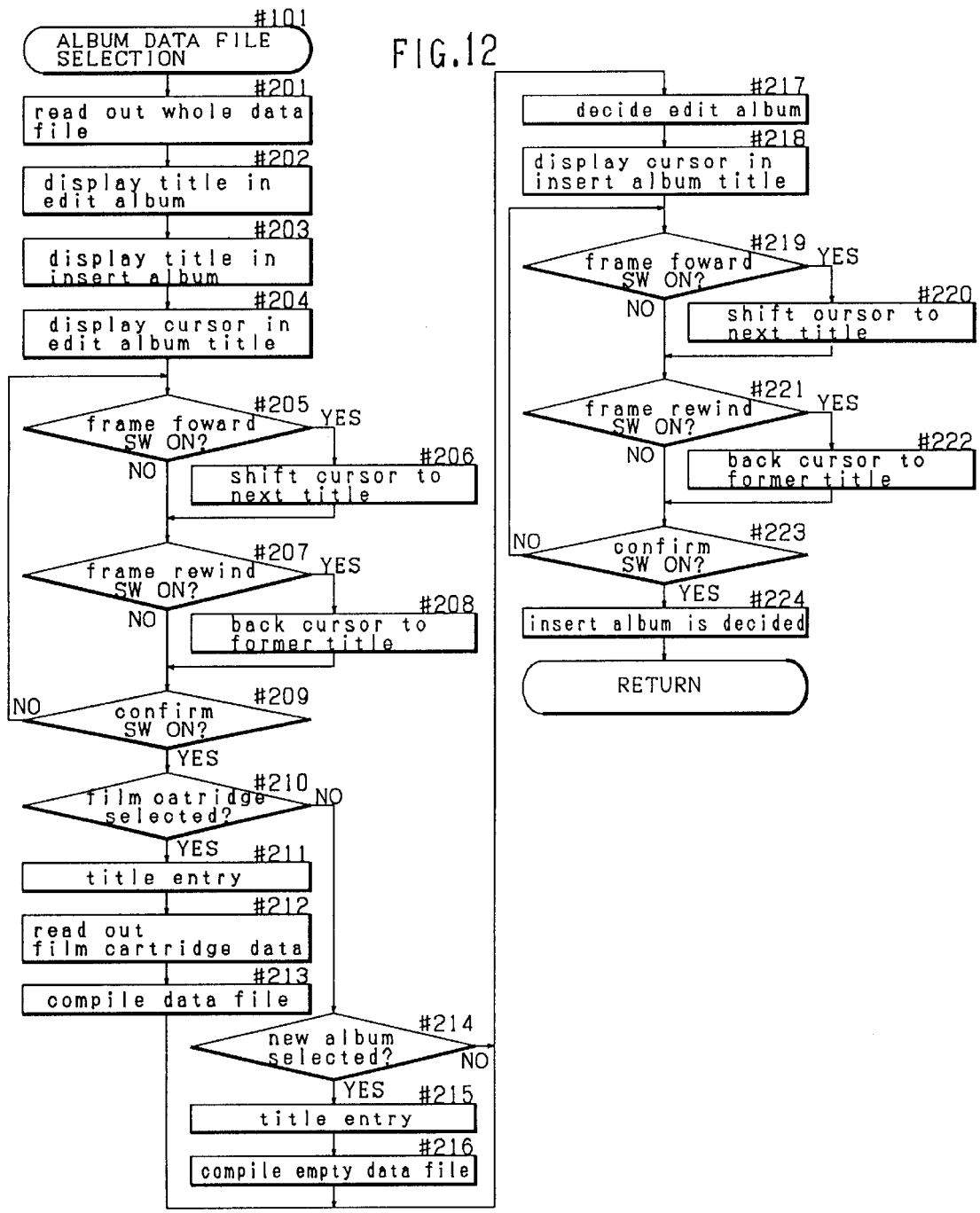
FIG. 12 is a flow chart illustrating an album data file selection routine.

FIG. 12 shows a sub-routine of Step #101 for selecting the album data file. First, the whole album data files are read out from the image filing unit 28 (Step #201) and a list of their titles are displayed in both the edit and insert album display sections of the screen (Steps #202 and #203). The cursor is pointed to a desired title of the edit album files to be edited (Step #204). FIG. 19 shows an example of the album edit start screen. A desired album to be edited can be selected with the edit album selecting cursor 101 which is reverse in illumination and can be moved throughout the edit album file display section 103. When a film input selection menu 105 is selected by the cursor 101, images in the film cartridge are designated as the target edit album. A new album file menu 106 is selected by the cursor 101, a new album (data file) mode is set. This new album may be used for changing the order of the existing frames. Similarly, a desired insert album file is selected by the insert album selecting cursor 102 within the insert album file display section 104 of the screen. As shown in the example, the date of phototaking is indicated as added to each album title. The date may be read out directly from the film cartridge or entered by using the operating keys. The albums carrying no date are original files factory installed in the image filing unit 28 and not provided by the operator.

Returning to the flow chart of FIG. 12, the forward key is checked (Step #205). If it is turned on, the cursor 101 is moved to the next edit album title (Step #206). Then, it is checked whether or not the rewind key is on (Step #207) and if yes, the cursor 101 is moved back to the preceding album title (Step #208). The "confirm" key is checked (Step #209) and if it is off, the procedure returns to Step #205 for repeating the same action. If the "confirm" key is on, the film cartridge is now checked whether or not it is selected (Step #210). If yes, the procedure goes to the entry of a title from the film cartridge (Step #211), the read out of relevant data from the same (Step #212), and the compiling of the album data file (Step #213). If no at Step #210, it is checked whether or not a new album is selected (Step #214). If yes, a desired title is entered (Step #215) and the new album file with no frames (of image data) is produced (Step #216). At Step #217, the edit album is designated by any album file of the film cartridge when the film cartridge mode is selected or a newly produced album file when the new album file mode is selected. Also, the edit album can be selected with the cursor 101 from the list of the album files on the screen.

Thereafter, for selecting the insert, the cursor 102 is moved to an insert album title on the screen (Step #218). At that time, the cursor 101 remains at the edit album title selected. The forward key is checked (Step #219) and if it is turned on, the cursor 102 is advanced to the next insert album title (Step #220). Then, it is checked whether or not the "rewind" key is on (Step #221) and if yes, the cursor 102 is moved back to the preceding album tile (Step #222). The "confirm" key is checked (Step #223) and if it is off, the procedure returns to Step #219 for repeating the same key checking action. If the "confirm" key is on, the album title indicated by the cursor 102 becomes a target insert album file. The example shown in FIG. 19 may be added with other advanced functions; (1) a reduced size of the first frame of image of an album file being displayed beside the album title for suggesting the contents of the album file and (2) scrolling of the album file title screen for viewing a greater number of titles.

Figure 13:
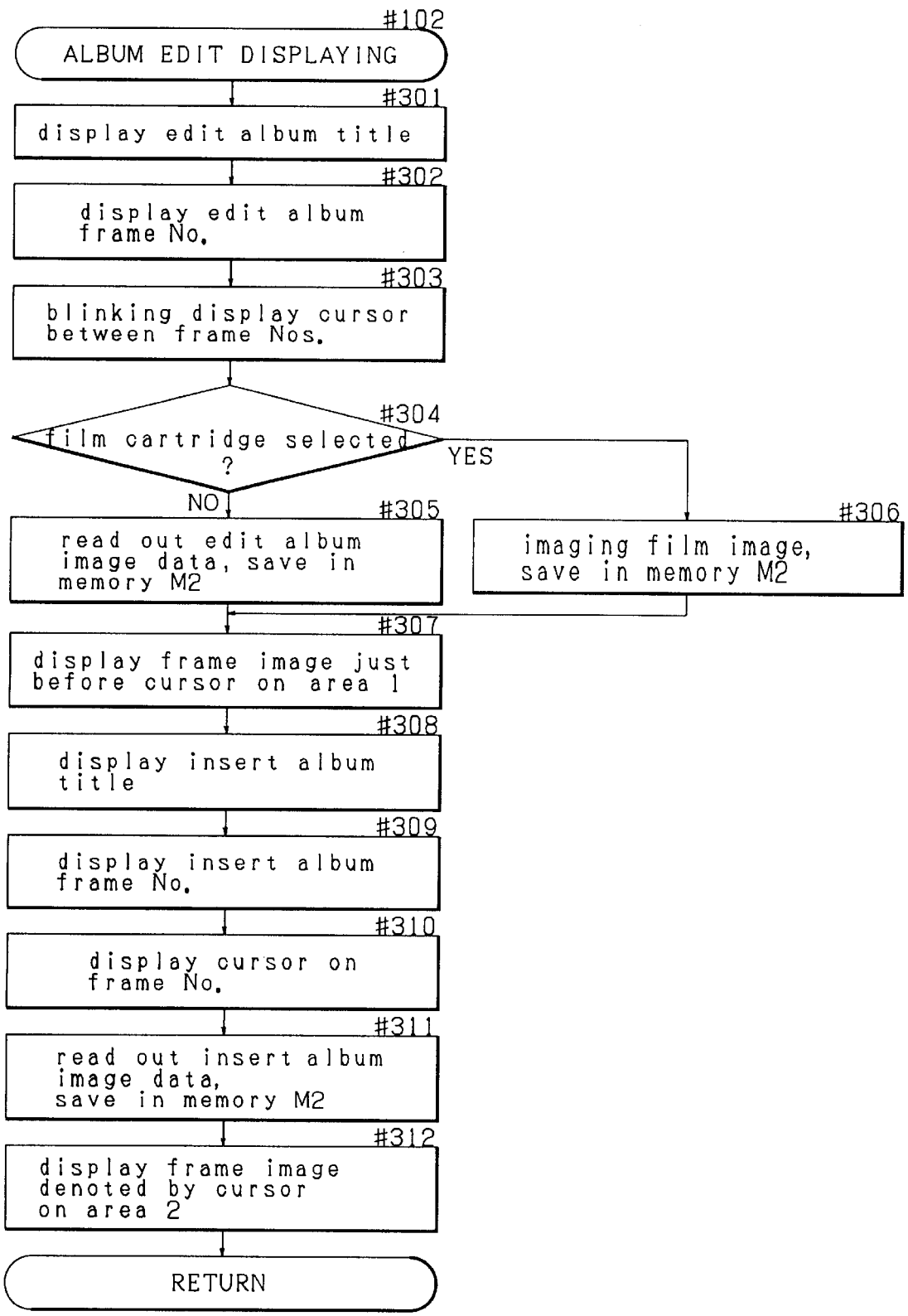
FIG. 13 is a flow chart illustrating an album edit display routine.

FIG. 13 is a sub-routine of the album edit action of which an example is illustrated in FIG. 20. It starts with displaying the title 107 of the selected edit album determined by the previous sub-routine (Step #301). Then, a set of frame numbers 111 in the edit album are displayed (Step #302) and the insert location selecting cursor 109 is moved to a desired location for insertion (Step #303). While the cursor 109 blinks, it can be controlled for pointing action and placed between any two frame numbers. The image data of the edit album file Is read out and stored temporarily in the second memory 10 (M2) (Steps #304 to #306). When the film cartridge is selected as the edit album file, images of the film are reproduced, and its data is decimated or compressed to a reduced size which is then saved In the second memory 10. When the second memory 10 is large enough to hold the data, such data decimation or compression is not needed. Otherwise, the data of the edit album file is read out from the image filing unit 28, reduced by decimation or compression, and saved in the second memory 10. By repeating that action, the image data of the whole edit album files is read out from the film cartridge or image filing unit and stored in the second memory 10. Then, the image data of a preceding frame situated before the insert location selecting cursor 109 is read out from the second memory 10 and displayed in a first display area of the screen (Step #307). The inserting frame is disposed after the frame displayed in the first display area.

In a similar manner, the insert album file is then displayed with its title 108 (Step #308). A set of frame numbers 112 of the insert album are shown (Step #309) and the Inserting frame selecting cursor 110 is advanced to a desired inserting frame (Step #310). The image data of the insert album file is read out, reduced by decimation or compression, and stored in the second memory 10 (Step #311). At the time, the second memory 10 holds the entire image data of the edit album and the insert album in data reduced format. The image data of the inserting frame denoted by the inserting frame selecting cursor 110 is read out from the second memory 10 and displayed in a second display area of the screen (Step #312).

Figure 14:
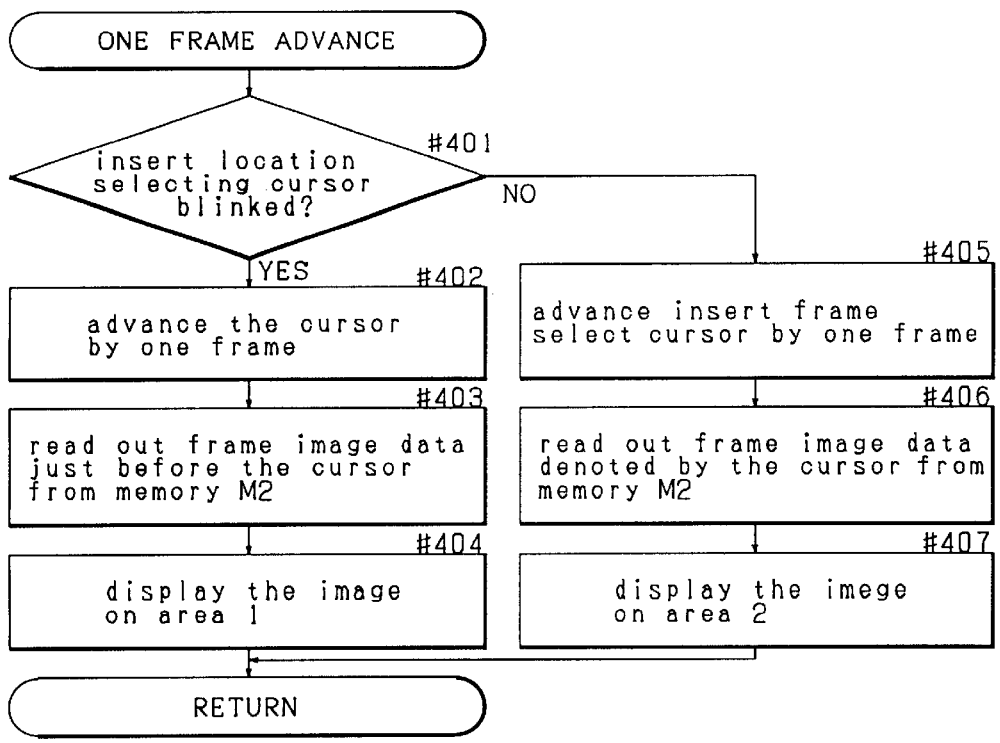
FIG. 14 is a flow chart illustrating the one frame advance routine.

FIG. 14 illustrates a sub-routine for advancing the cursor with the "forward" key turned on. By identifying the blinking cursor, it is checked whether the mode is for selecting the location of insertion or the inserting frame (Step #401). The initial screen shows the inserting frame selecting cursor 110 blinking. When the edit/insert album selection switch is turned on at Step #103 shown in FIG. 11, the opposite cursor is enabled. If the insert location selecting cursor 109 is on at Step #401, it is advanced one frame (Step #402) and the image data of a preceding frame situated before the cursor 109 is read out from the second memory 10 and displayed in the first display area (Step #403 and #404). If the inserting frame selecting cursor 110 is on at Step #401, it is moved forward by one frame and the image data of the frame denoted by the cursor 110 is read out from the second memory 10 and displayed in the second display area (Steps #406 and #407).

Figure 15:
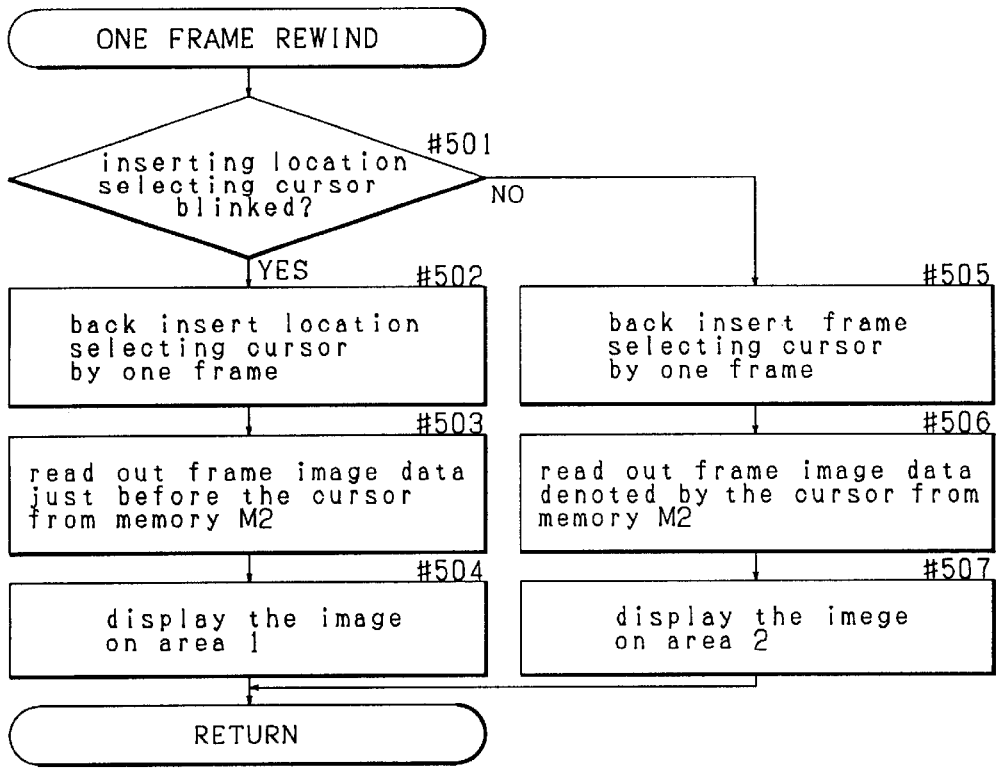
FIG. 15 is a flow chart illustrating the one frame reverse routine.

FIG. 15 shows a sub-routine for moving the cursor backward with the "rewind" key turned on. Similarly by identifying the blinking cursor, it is checked whether the mode is for selecting the location of insertion or the inserting frame (Step #501). If the insert location selecting cursor 109 is on, it is moved backward by one frame (Step #502) and the image data of a preceding frame situated before the cursor 109 is read out from the second memory 10 and displayed in the first display area (Step #503 and #504). If the inserting frame selecting cursor 110 is on, it is returned to a preceding frame and the image data of the frame is read out from the second memory 10 and displayed in the second display area (Steps #506 and #507).

Figure 16:
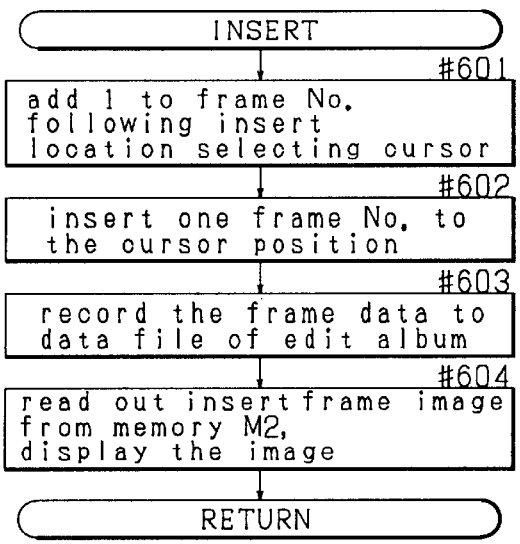
FIG. 16 is a flow chart illustrating an insertion routine.

FIG. 16 shows a sub-routine for inserting the inserting frame into the edit album file with the "conform" key turned on. It is assumed that the frame denoted by the inserting frame selecting cursor 110 is placed at the insert location indicated by the insert location selecting cursor 109 when the "confirm" key has been pressed. Each of the frame numbers situated after the insert location selecting cursor is increased by one (Step #601) and the frame number to be inserted is allocated to the insert location (Step #602). The image data of the inserting frame of the insert album file is retrieved and loaded at the insert location in the edit album file (Step #603). As the album data files are saved in the first system controller 21, this procedure is carried out in the first system controller 21. The insert location selecting cursor 109 is moved just after the frame number loaded and the image data of the inserting frame denoted by the inserting frame selecting cursor 110 is read out from the second memory 10 and displayed in the first display area of the screen (Step #604).

Figure 17:
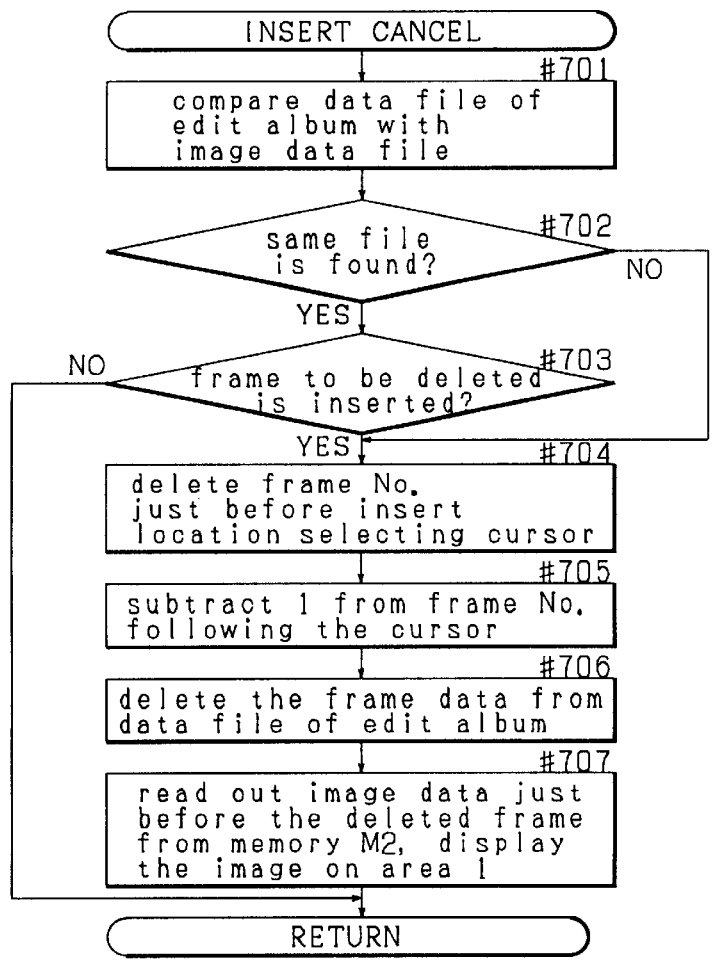
FIG. 17 is a flow chart illustrating an insert cancel routine.

FIG. 17 illustrates a sub-routine for canceling the frame inserted in the edit album file with the "cancel" key turned on. It is now assumed that the image data of a preceding frame situated just before the insert location selecting cursor is deleted from the edit album file. The edit album file is compared with the list of the album data files in the image filing unit 28 (Step #701). If the title of the edit album file is not found in the list (NO at Step #702), it is determined to have been produced in the new album mode and the procedure moves to Step #704. If the same title is found in the list and the frame to be deleted is also contained in the counterpart file, it is determined as an original picture and not deleted. The procedure is thus ended. If the frame is not present in the counterpart file, it is designated as an inserted image and the procedure advances to Step #704. In the procedure after Step #704, the frames inserted at present only are deleted. The deletion of any original frame is never conducted in the album edit mode action. After the frame number situated before the insert location selecting cursor 109 is deleted at Step #704, one is subtracted from each of the frame numbers after the cursor 109 (Step #705). The image data of the target frame is then deleted from the edit album file (Step #706) and the image data of a preceding frame before the delete frame is read out from the second memory 10 and displayed in the first display area (Step #707).

Figure 18:
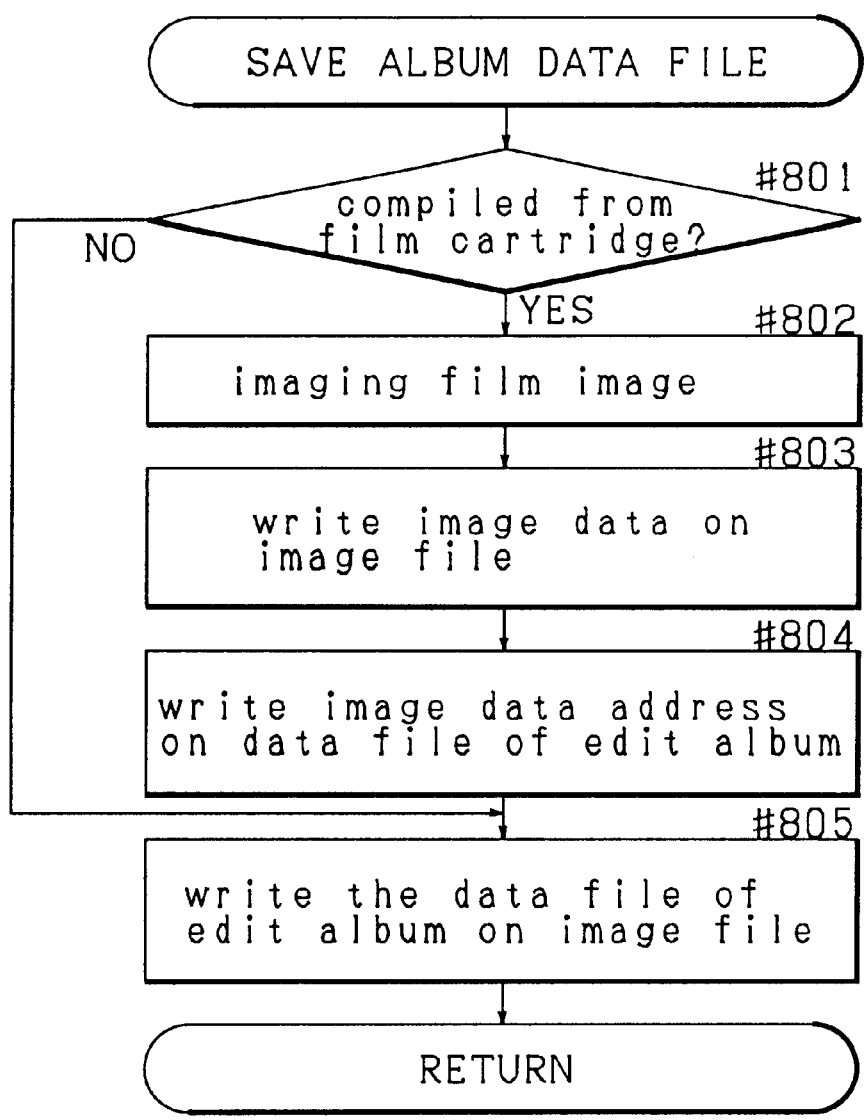
FIG. 18 is a flow chart illustrating an album data file save routine.

FIG. 18 shows steps of writing the edited album data into the image filing unit 28 with the "file" key. It is first checked whether or not the edit album is from the film cartridge (Step #801). If yes, its film images are reproduced (imaged) (Step #802) and stored in the form of an image data in the image filing unit 28 (Step #803). The address of the image data is written to the data file of the edit album (Step #804) and the edit album data file is also stored in the image filing unit 28. If no at Step #801, it is determined that the image file is present and the procedure goes to Step #805.

Figure 22:
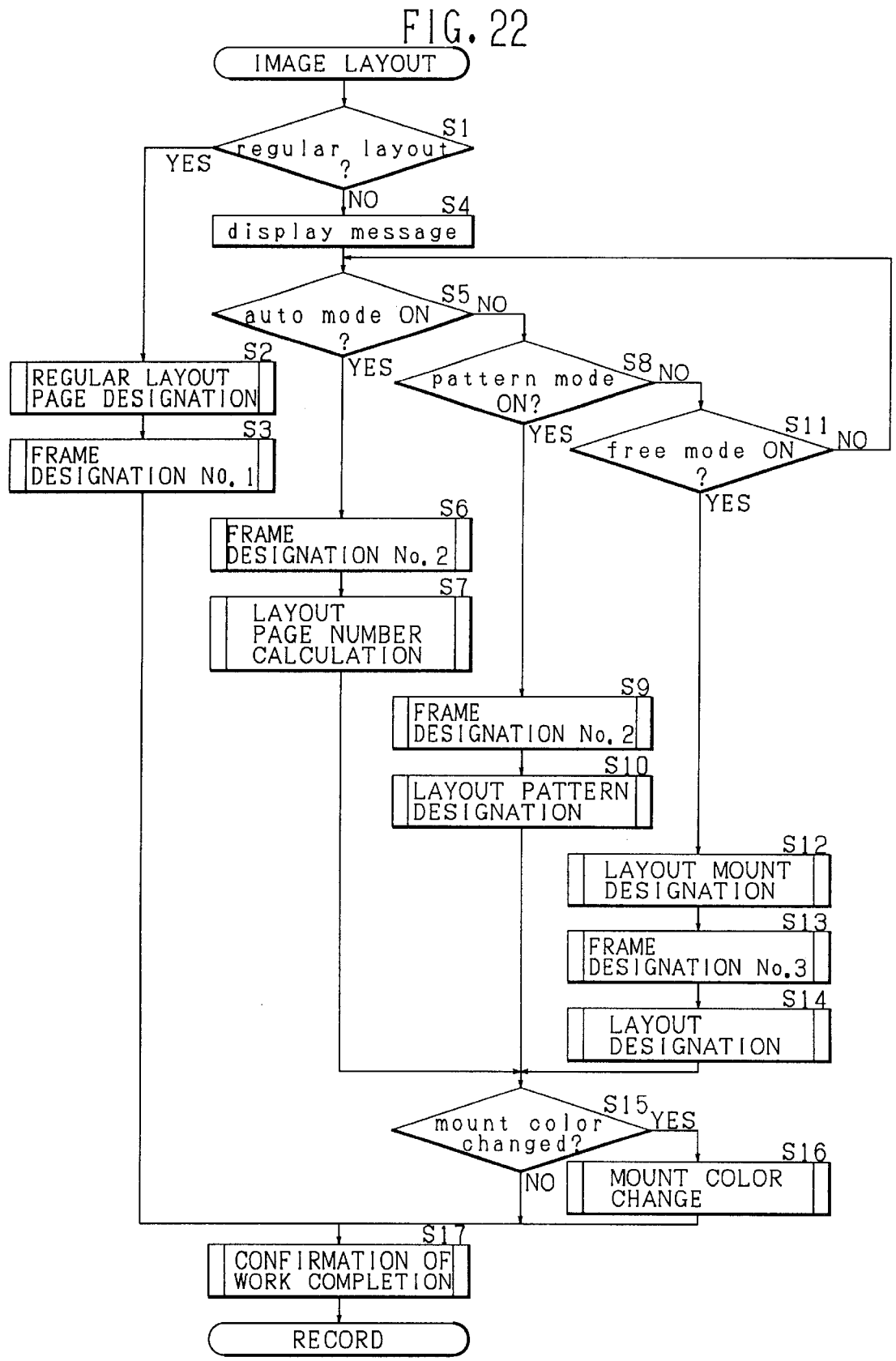
FIG. 22 is a flow chart illustrating an image layout routine.

FIG. 22 illustrates routines of putting images from a cartridge film on another image in an image album with the use of a layout edition. If the layout edition is regular layout used in a specified application, the procedure is instantly carried out (Steps S1 to S3). If not, the message screen is displayed (Step S4), allowing the operator to select from the automatic mode, pattern (semiautomatic) mode, and free mode with a mode selector switch (not shown) according to the message screen. An example of the message screen is shown in FIG. 39. Layout data is stored in the disk.

Figure 42:
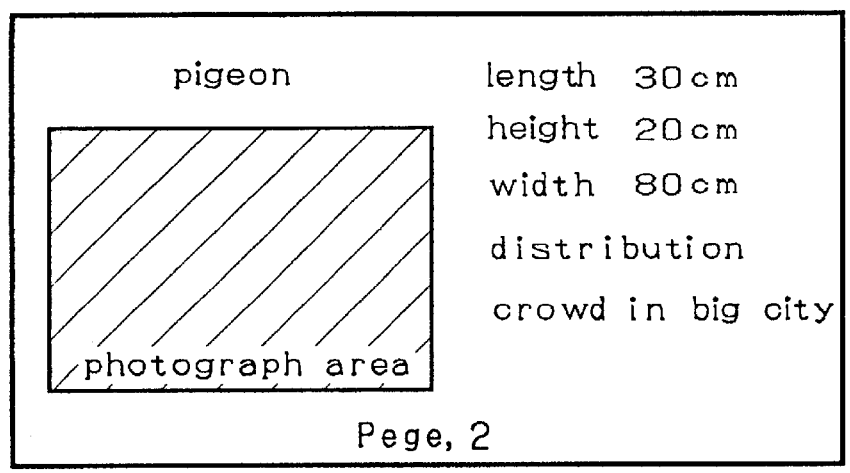
FIG. 42 is a diagram showing a display of a regular layout.

The regular layout edition enables an image photographed by the operator to be put on a layout mount in a specific application. Hence, the size and location of the image to be superimposed are predetermined. An example of the regular layout edition is illustrated in FIG. 42 in the form of an electronic data file of birds, in which (1) reviewing the name of a bird and illustration or photograph of the data file (which is displayed in the photograph area in the screen) displayed on the monitor 55, the operator searches and designates the page on which the same kind of bird as he has photographed is located. Graphic data including bird name, characteristics, habitation, etc. are displayed on the monitor 55, (2) the operator selects an image frame reproduced from a film which he has photographed, and (3) the image photographed by himself is displayed as superimposed on a photographed area of the designated page.

Figure 43:
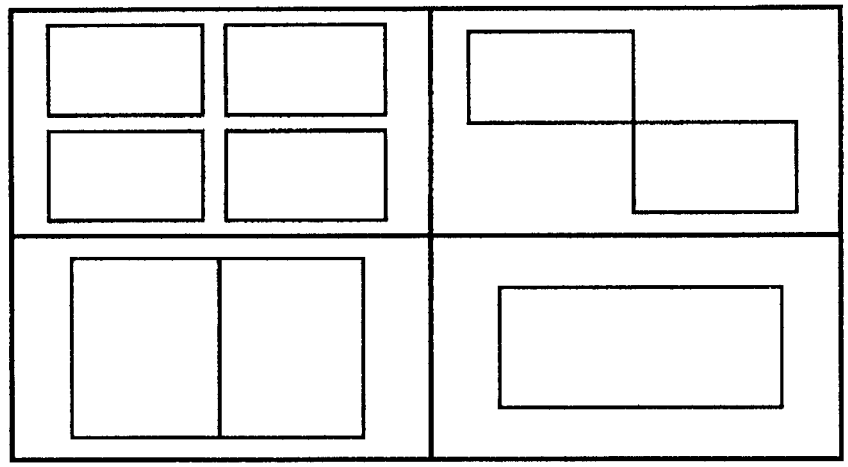
FIG. 43 is a diagram showing a layout pattern.
Figure 44:
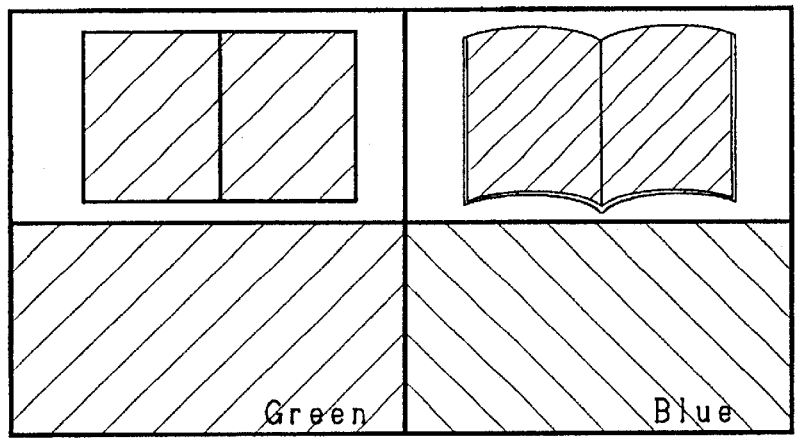
FIG. 44 is a diagram showing a layout mount.
Figure 45:
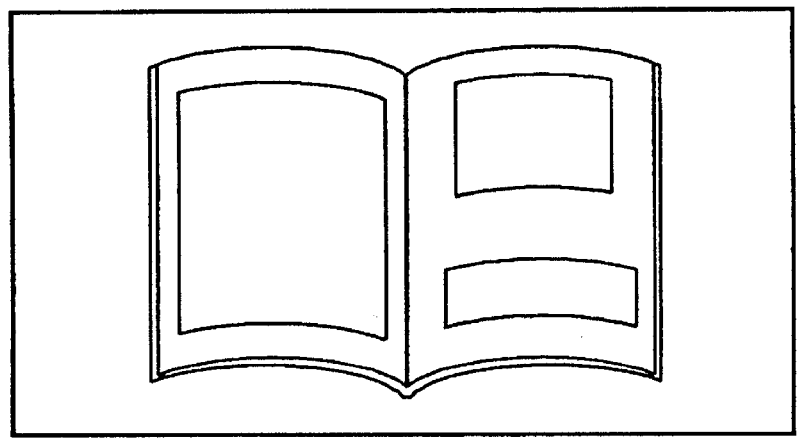
FIG. 45 is a diagram showing a free layout.

The automatic mode permits a desired number of frames to be put on a layout automatically in a neat style by suited pages thereof (Steps S6 and S7). The layout pattern mode enables a given number of selected frames displayed in a desired pattern selected from a plurality of the stored patterns (Steps S9 and S10). An example of the patterns is shown in FIG. 43. The free layout mode allows selected frames to be arranged freely in any desired layout (Steps S12 to S14) similar to a conventional job of pasting photographs on sheets of an album. Features of the free layout mode are shown in FIGS. 44 and 45. The free layout mode is advantageous over the conventional pasting method because it offers freehand sizing and trimming of a superimposing image. The following are constants employed and their definitions.

Table 1
N: number of regular layouts
n: n-th layout
K: total number of frames in a film
k: k-th frame
T: number of theme blocks
t: t-th theme block
J: number of frames in the t-th theme block
j: J-th frame in the theme block
B: number of divided segments in multi-image display
b: b-th divisional location
M: number of selected frames in the theme block
m: m-th frame
P: number of pages
p: p-th page
R: total number of pattern layouts
r: r-th pattern layout
Q: number of photographs assigned to a given layout
q: q-th photograph
Y: number of layout mount sheets
y: y-th layout mount sheet
FTB: number of titles in an electronic file
FK: number of frames in the electronic file.
The theme blocks are specified by an attribute factor such as data as contained in one single film.

Figure 23:
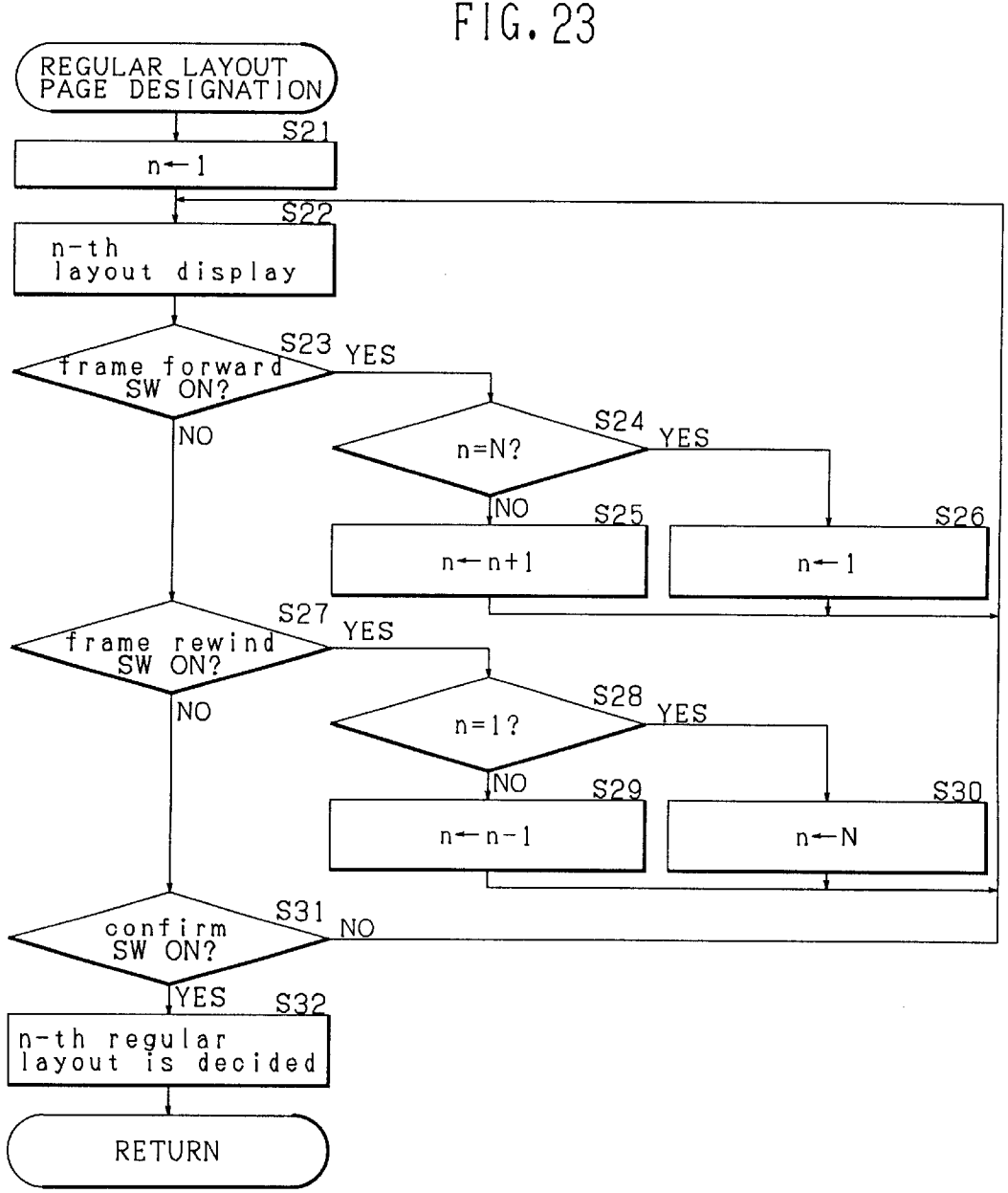
FIG. 23 is a flow chart illustrating a regular layout page designation routine.

FIG. 23 illustrates a sub-routine for a page designation of regular layout. It starts with displaying a first page of the layout (Steps S21 and S22). When the "forward" key is pressed, a succeeding layout page is displayed (Steps S23 to S26). When the "rewind" key is pressed, a preceding layout page is displayed (Steps S27 to S30). Those steps may be continued in a loop or terminated at each end. When the "confirm" key is pressed, the page displayed on the screen is selected for use (Step S32).

Figure 24:
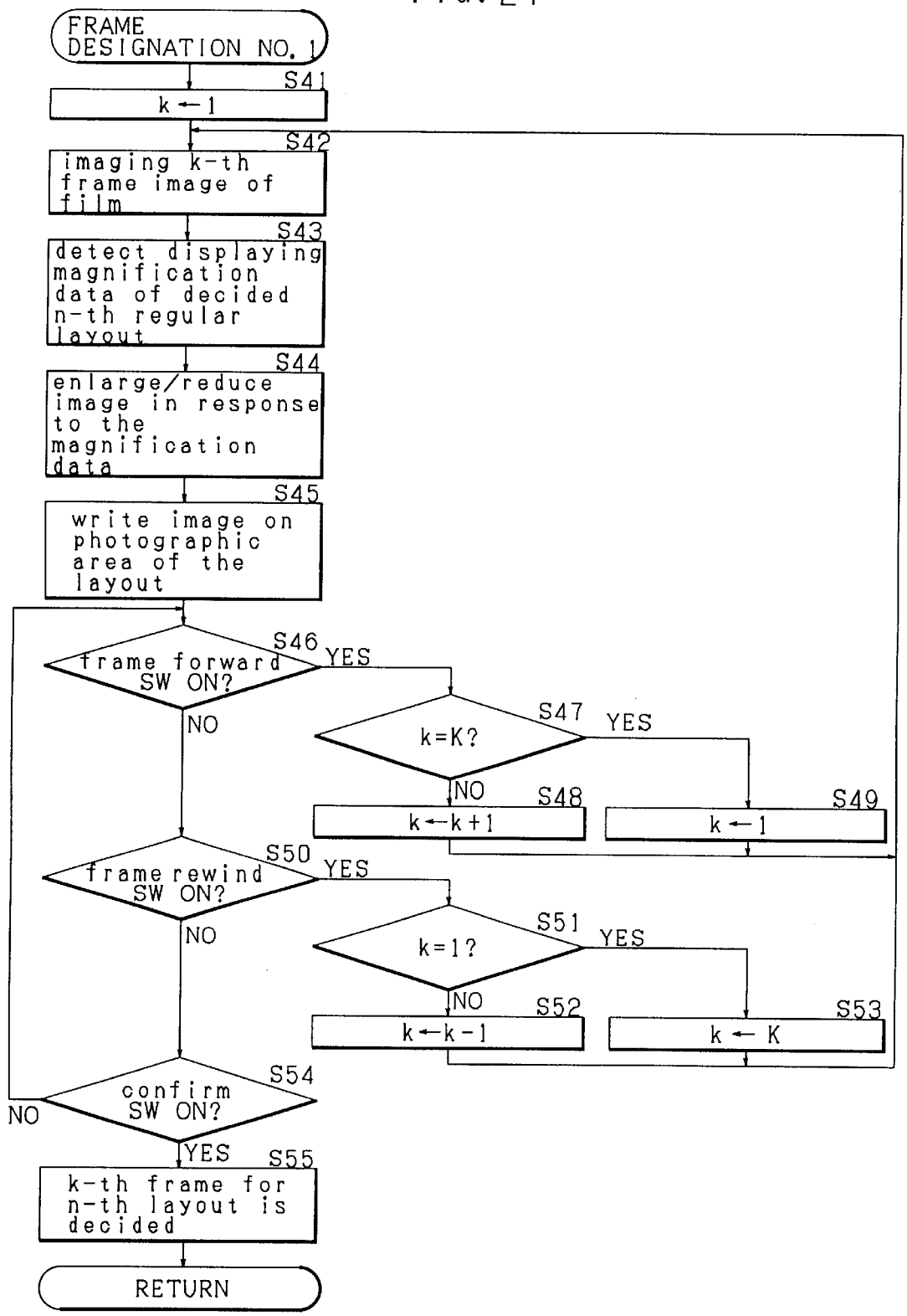
FIG. 24 is a flow chart illustrating the frame designation No.1 routine.

FIG. 24 shows a sub-routine (of Step S3 shown in FIG. 22) for a frame designation No.1 mode. It starts with reproducing the first frame image on the film (Steps S41 and S42), detecting a displaying magnification data of a desired photograph area display segment in an n-th layout determined previously (Step S43), enlarging or reducing the size of the frame according to the magnification data (Step S44), and writing the image on the photograph area of the layout (Step S45). When the "forward" key is pressed, a succeeding frame is displayed (Steps S46 to S49). When the "rewind" key is pressed, a preceding frame is displayed (Steps S50 to S53). Those steps may be continued in a loop or terminated at one end. When the "confirm" key is pressed, the frame displayed is selected. The selection of frames may be conducted by entering their numbers with the numeral keys rather than the "forward" and "rewind" keys.

Figure 25:
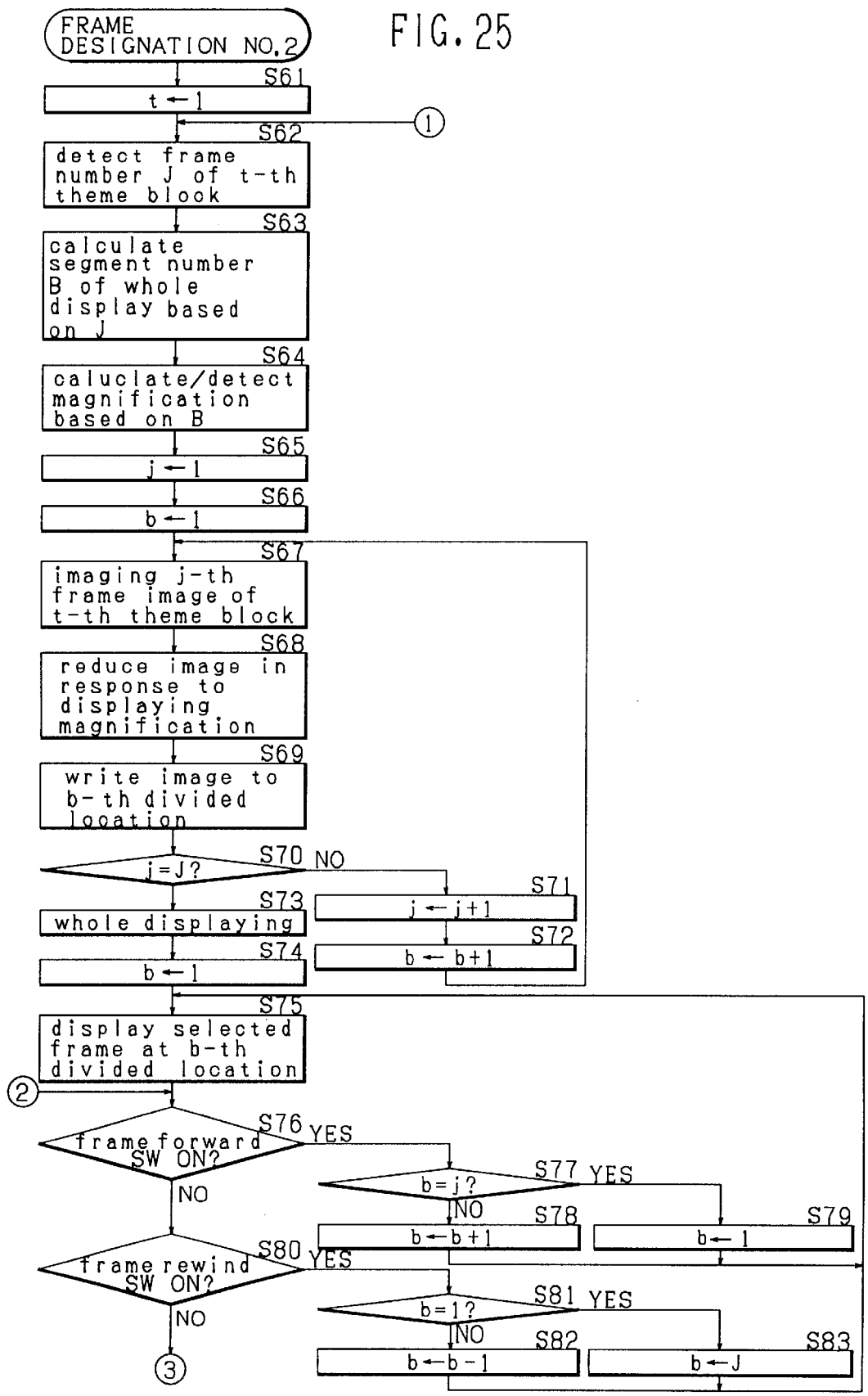
FIG. 25 is a flow chart illustrating the frame designation No.2 routine.
Figure 26:
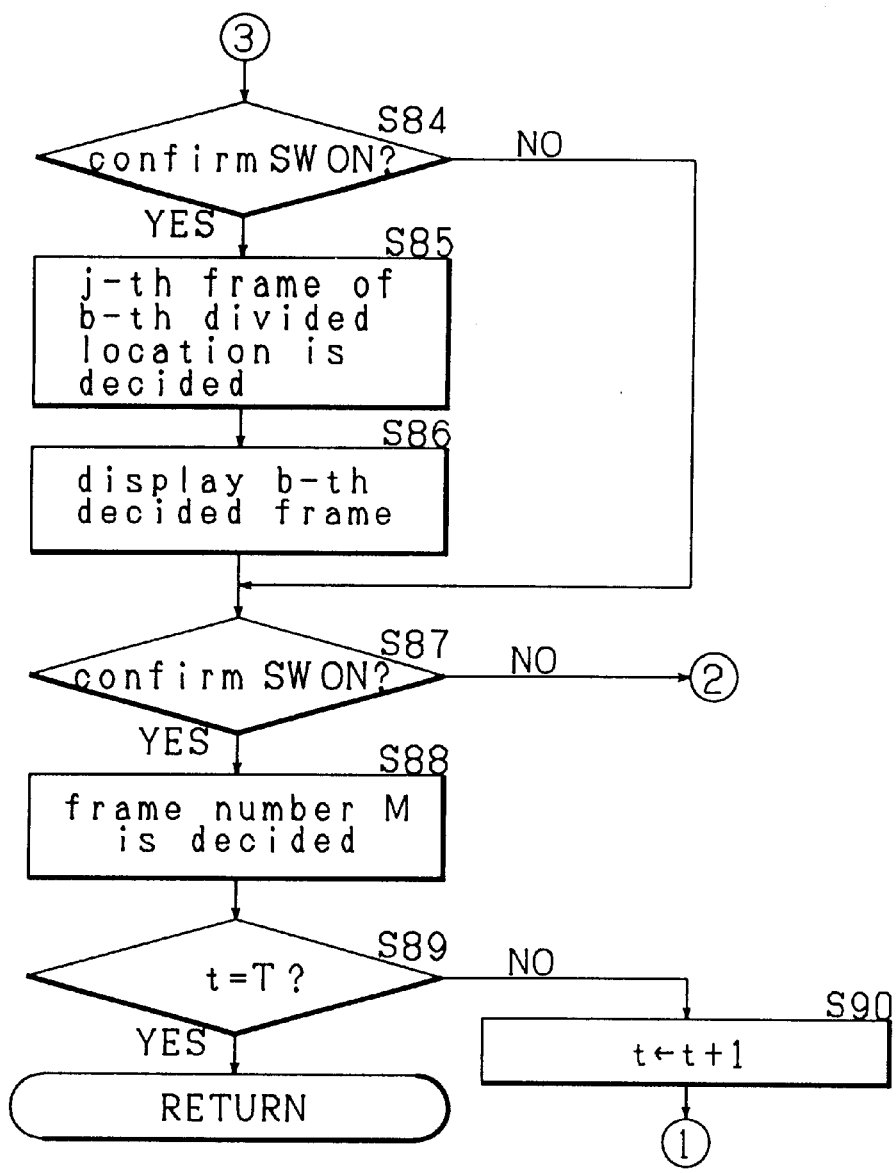
FIG. 26 is a flow chart illustrating the frame designation No.2 routine.

FIGS. 25 and 26 illustrate a sub-routine (of Step S6 shown in FIG. 22) for a frame designation No.2 mode in automatic mode. The procedure of the sub-routine will be summarized for ease of understanding. It starts with detecting the number of frames J in a theme block of the film, calculating the number of display divided segments B (>J) in a multi-image screen, and determining or detecting the magnification data (Steps S61 to S64). Then, a given number of the frame images and their writing position are determined (Steps S67 to S72) and the whole frames are displayed at once (Step S73). The selecting pointer of a frame shape is displayed at the first frame (Steps S74 and S75). When the "forward" key is pressed, the pointer moves to a succeeding frame (Steps S76 to S79). When the "rewind" key is pressed, the pointer goes back to a preceding frame (Steps S80 to S83). Those steps may be continued in a loop or terminated at one end. When the "confirm" key is pressed, the frame denoted by the pointer is selected for placement in the album (Steps S84 to S86). The selection of the frames in the theme block is finished by pressing the "confirm" key again, where number of the selected frames is M. If another theme block is needed for selection, its entire frames are displayed in a multi-image screen and the foregoing procedure is repeated until the processing of all required theme blocks in the film are completed (Steps S89 and S90). The processing for each theme block is advantageous in composition of an album because the theme block represents a particular event or feature.

Figure 27:
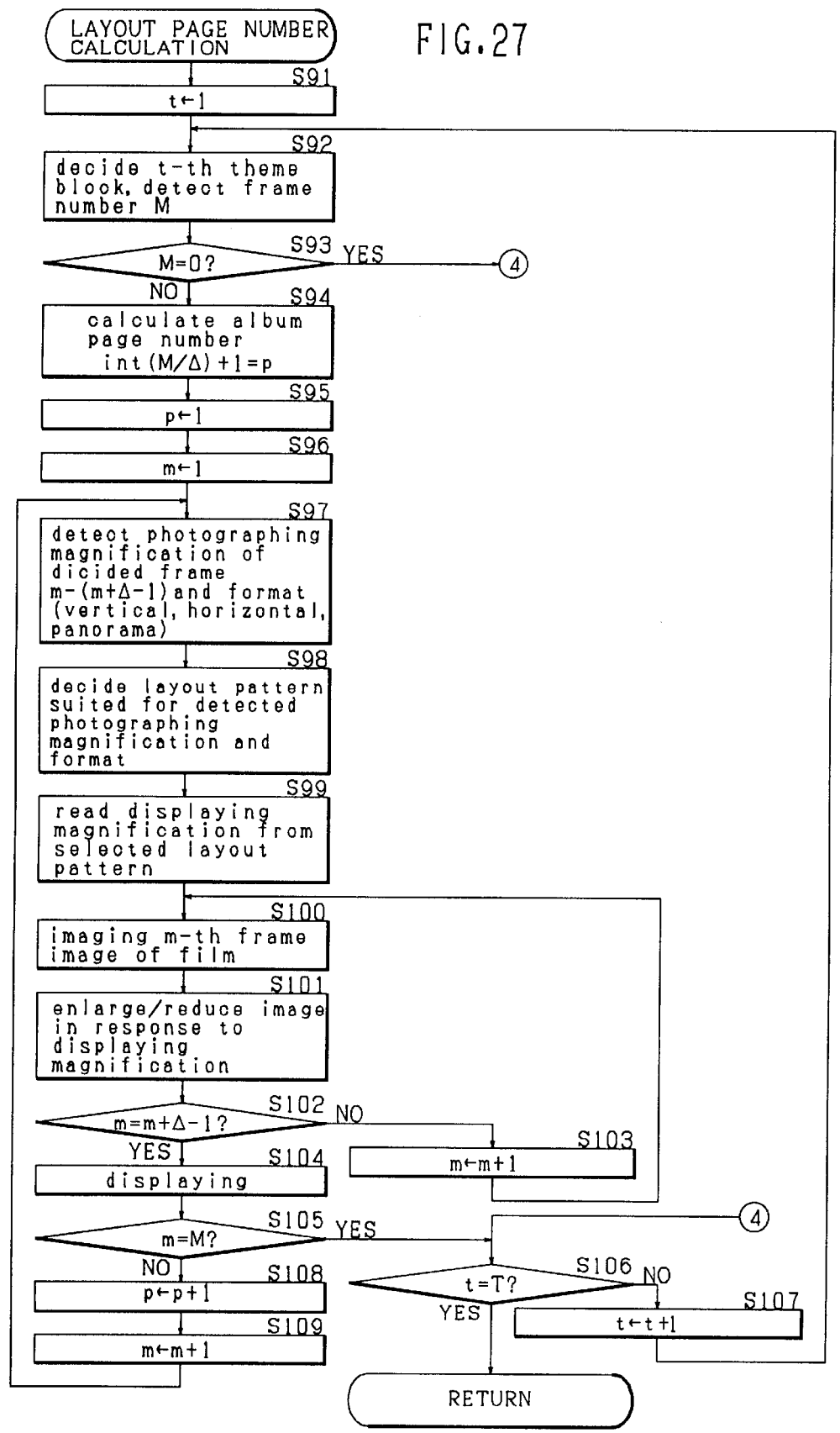
FIG. 27 is a flow chart illustrating a layout page number calculation routine.

FIG. 27 shows a sub-routine (of Step S7 shown in FIG. 22) for calculating the number of layout pages after the frame designation No.2 mode. It starts with detecting the frame number M to be selected for an album (Step S92) and calculating the number of pages P of the album from the frame number applicable to each of album page sheet (Step S94). The image data of the frames is detected (Step S97), a layout pattern suited for the image is selected (Steps S98), and the displaying magnification data of the photograph area is read (Step S99). The steps are followed by reproducing image data of the decided frame number to be put on the layout from the film images (Step S100), enlarging or reducing the size of the frames according to the magnification data (Step S101), and overwriting the enlarged or reduced frame image on the photographed area of the album sheet. After the overwriting of the frame image onto one page, the multi-image page is displayed (Step S104). An example of the page is shown in FIG. 43. The steps are repeated until the total pages are completed.

Figure 28:
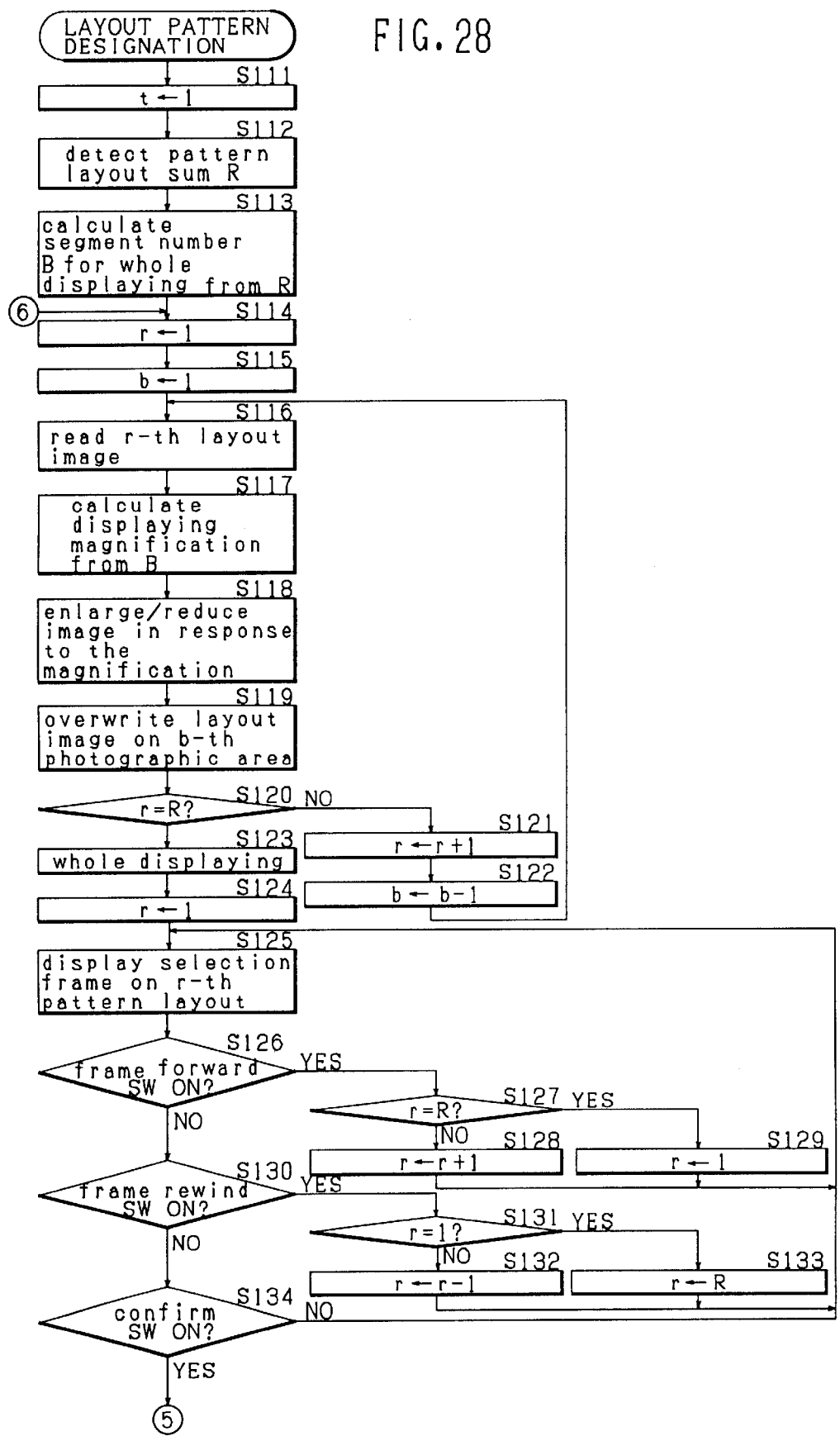
FIG. 28 is a flow chart illustrating a layout pattern designation routine.
Figure 29:
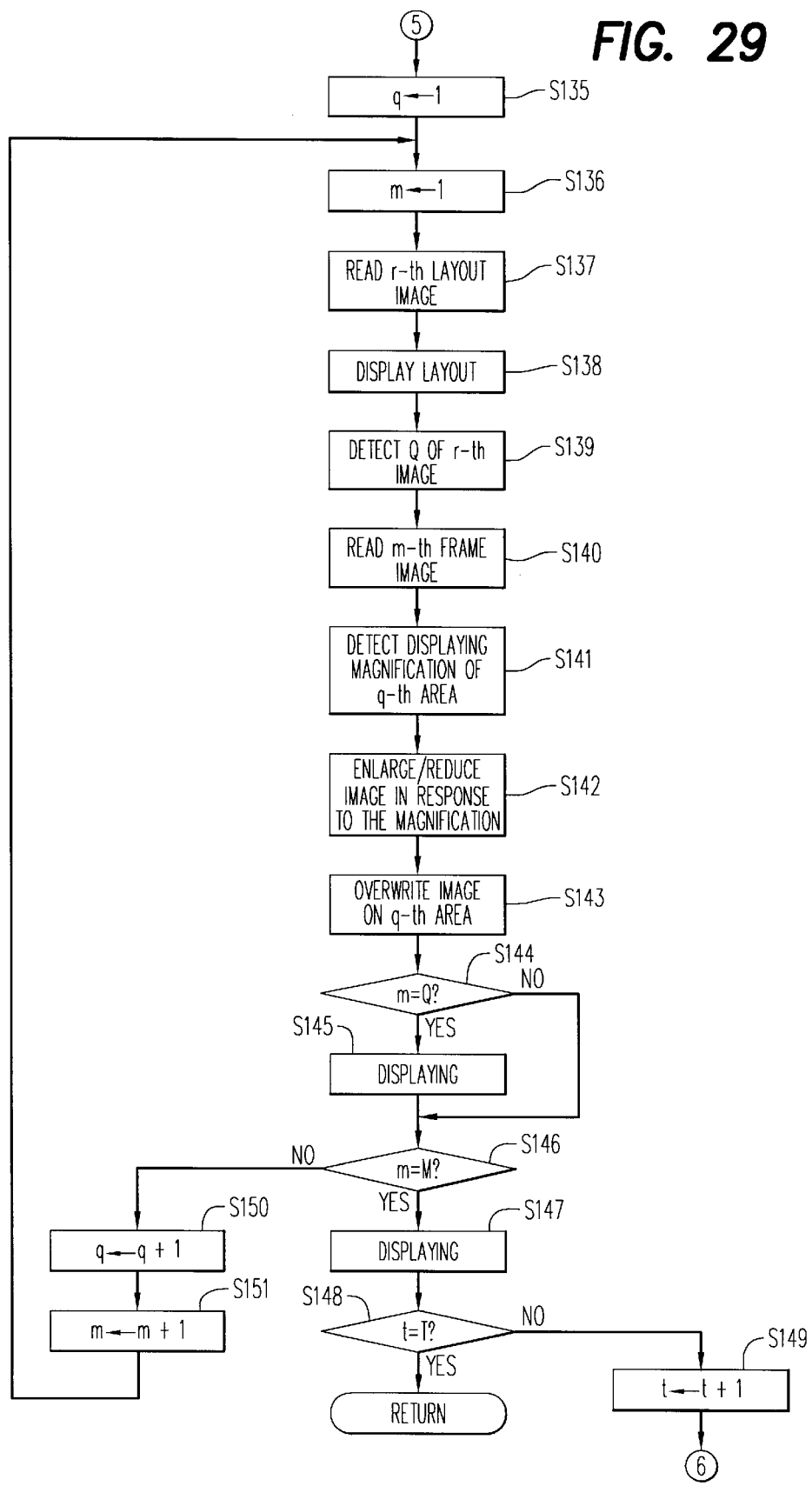
FIG. 29 is a flow chart illustrating a layout pattern designation routine.

FIGS. 28 and 29 illustrate a sub-routine (of Step S10 shown in FIG. 22) for designating a layout pattern after the frame designation in the No.2 or pattern mode. It starts with detecting the number of layout patterns R installed in the electronic album or disk (Step S112), calculating the number of display divided segments B (>R) in a multi-image screen from the layout pattern number R (Step S113), and reading out the layout patterns from the disk (Step 116). The layout patterns are then enlarged or reduced according to the magnification data determined by the display segment number B and displayed in a multi-image screen (Steps S117 to S123). The pointer (selection frame) then is displayed for selecting one of the layout patterns on the screen (Step S125). A desired layout pattern is selected by denoting with the pointer (Steps S126 to S134). While the selected layout pattern is being displayed on the monitor screen, the procedure is continued by detecting the number of photographs Q in the photograph area and relevant magnification data, reading the image data of the frames, sizing them with the magnification data, and allocating the frames to their respective photograph areas (Steps S137 to S143). The steps are repeated until the entire frames selected are allocated.

Figure 30:
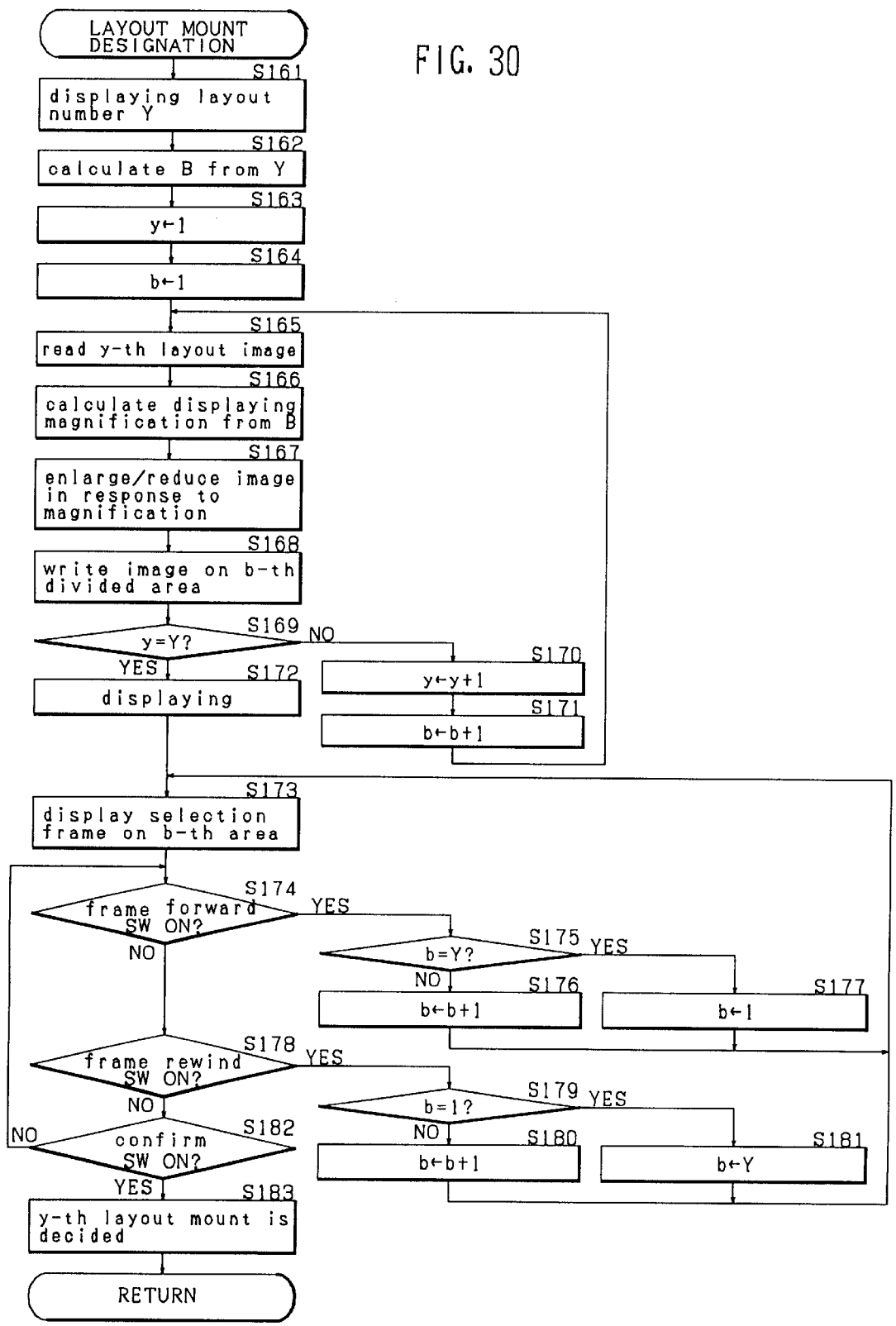
FIG. 30 is a flow chart illustrating a layout mount designation routine.

FIG. 30 illustrates a sub-routine (of Step S12 shown in FIG. 22) for designating a layout mount in free mode. It starts with detecting the number of layout mount sheets Y installed in the electronic album or disk and calculating the divided segments number B from Y (Steps S161 and S162). The steps are followed by reading the layout mount from the disk, determining the magnification data with the segment number B, enlarging or reducing the size of the image data, and displaying the entire layout sheets in a multi-image screen (Steps S165 to S172). An example of the layout mount display is shown in FIG. 44. After the pointer (selection from) is recalled, a desired layout mount is decided using the pointer and displayed in the full screen (Steps S173 to S183).

Figure 31:
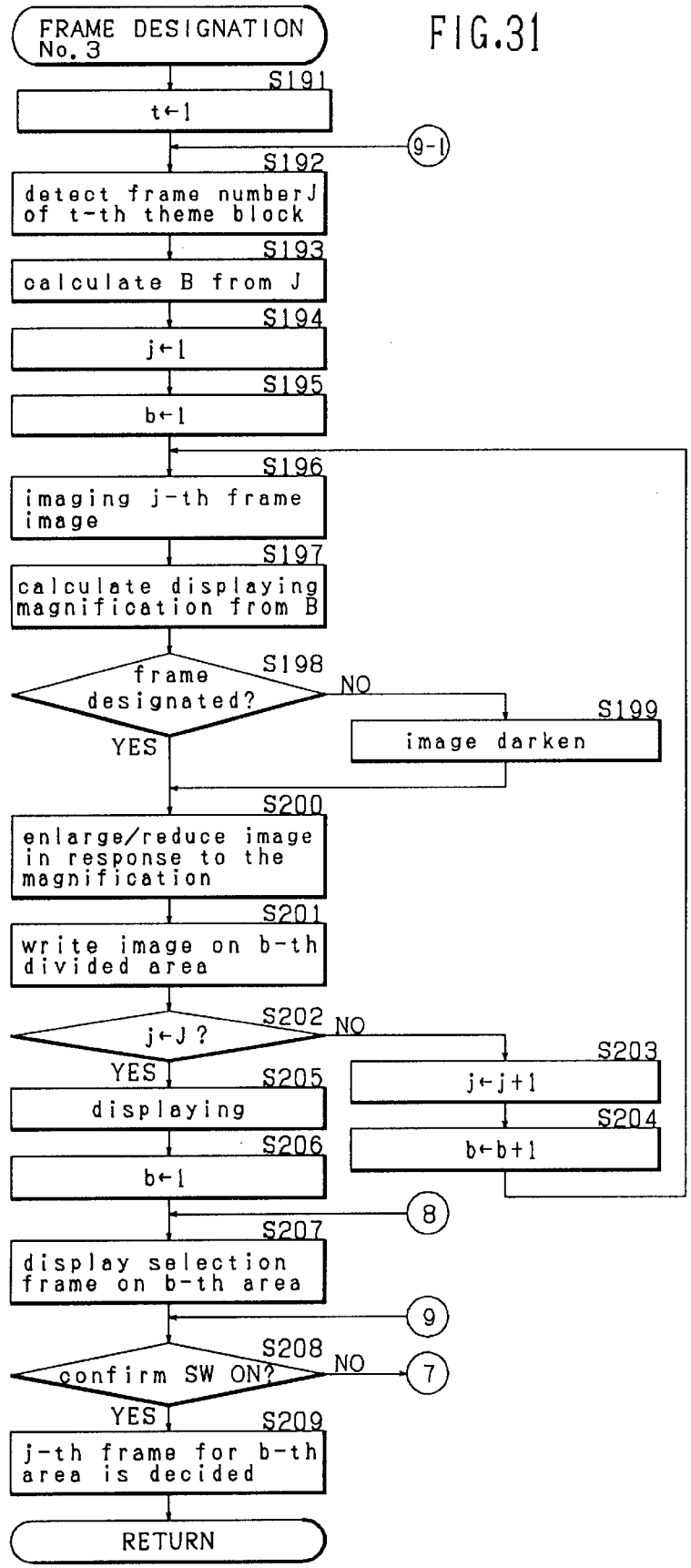
FIG. 31 is a flow chart illustrating the frame designation No.3 routine.
Figure 32:
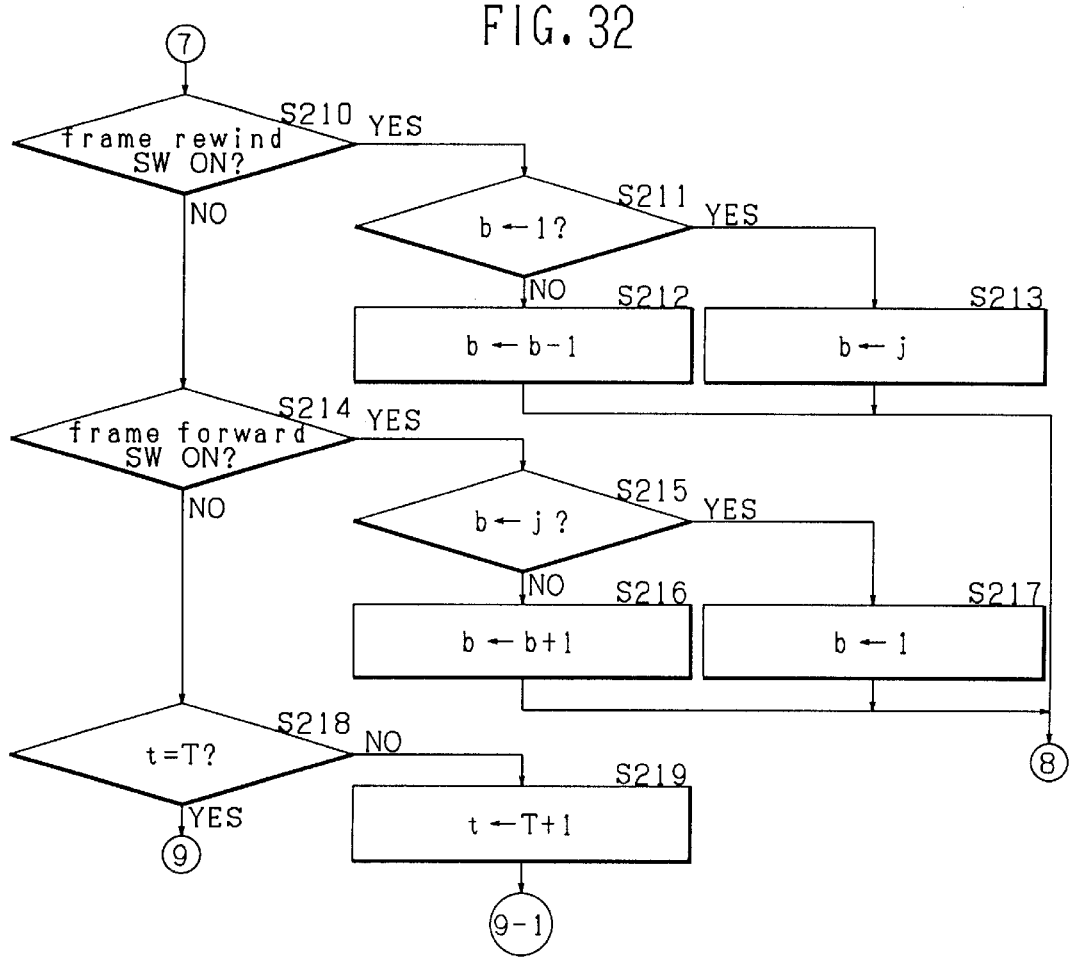
FIG. 32 is a flow chart illustrating the frame designation No.3 routine.

FIGS. 31 and 32 illustrate a sub-routine (of Step S13 shown in FIG. 22) for a frame designation No.3 mode after the designation of the layout mount. Similarly, it starts with displaying the entire frames in a theme block and the first frame is marked by the pointer (Steps S191 to S207). When the "forward" key is pressed, the pointer advances to a succeeding frame. When the "rewind" key is pressed, the pointer moves back to a preceding frame. Those steps may be continued in a loop or terminated at one end. Using the "confirm" key and "file" key, the frame is decided upon (Steps S208 to S219).

Figure 33:
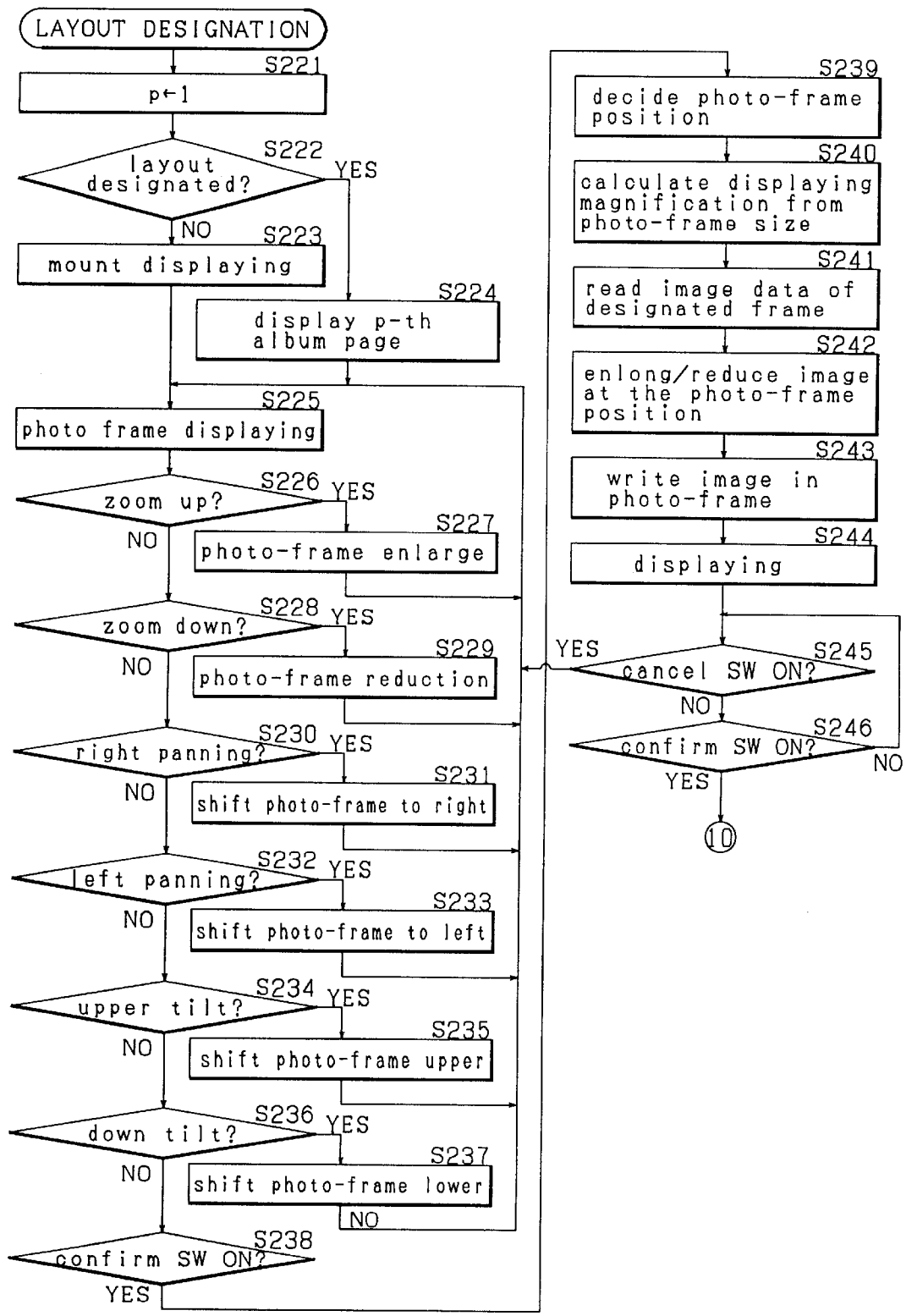
FIG. 33 is a flow chart illustrating a layout designation routine.
Figure 34:
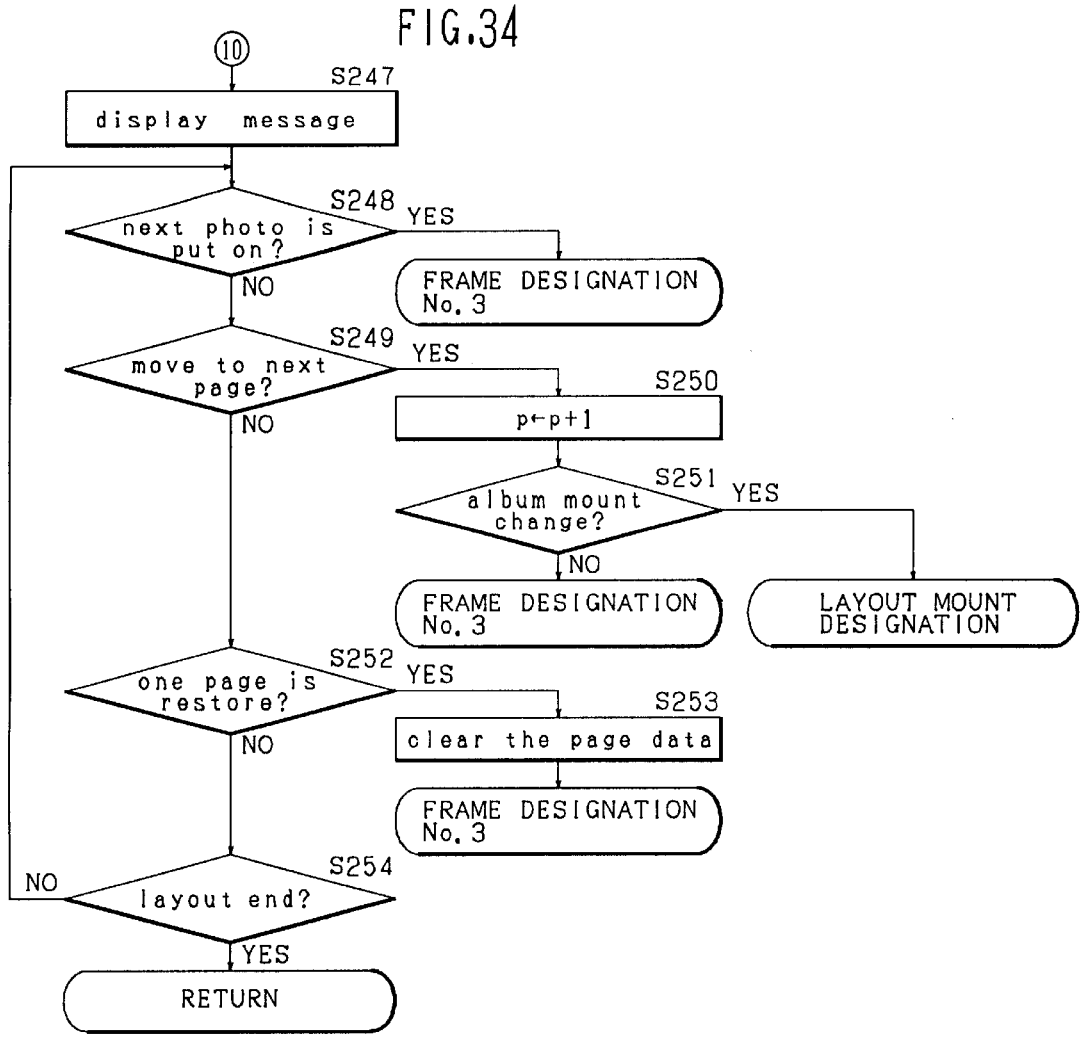
FIG. 34 is a flow chart illustrating a layout designation routine.

FIGS. 33 and 34 illustrate a sub-routine (of Step S14 shown in FIG. 22) for designating a layout after the designation of the layout mount. It starts with displaying the designated layout mount in full size (Steps S221 to S224). A desired photo-frame is displayed suitable for the format of the previously designated frame (Step S225). On the screen, the photo-frame is adjusted to a desired size and position (Steps S226 to S237). When the "confirm" key is pressed, the image data of the frame is displayed in the adjusted photo-frame as shown in FIG. 45. When the displayed layout is accepted, the "confirm" key is pressed and if not, the "cancel" key is used (Steps S235 and S246). When the "confirm" key is pressed again, the message screen shown in FIG. 40 appears (Step S247). Further steps are possible by selecting another message to continue the routine or perform a correcting action before ending the entire procedure.

Figure 35:
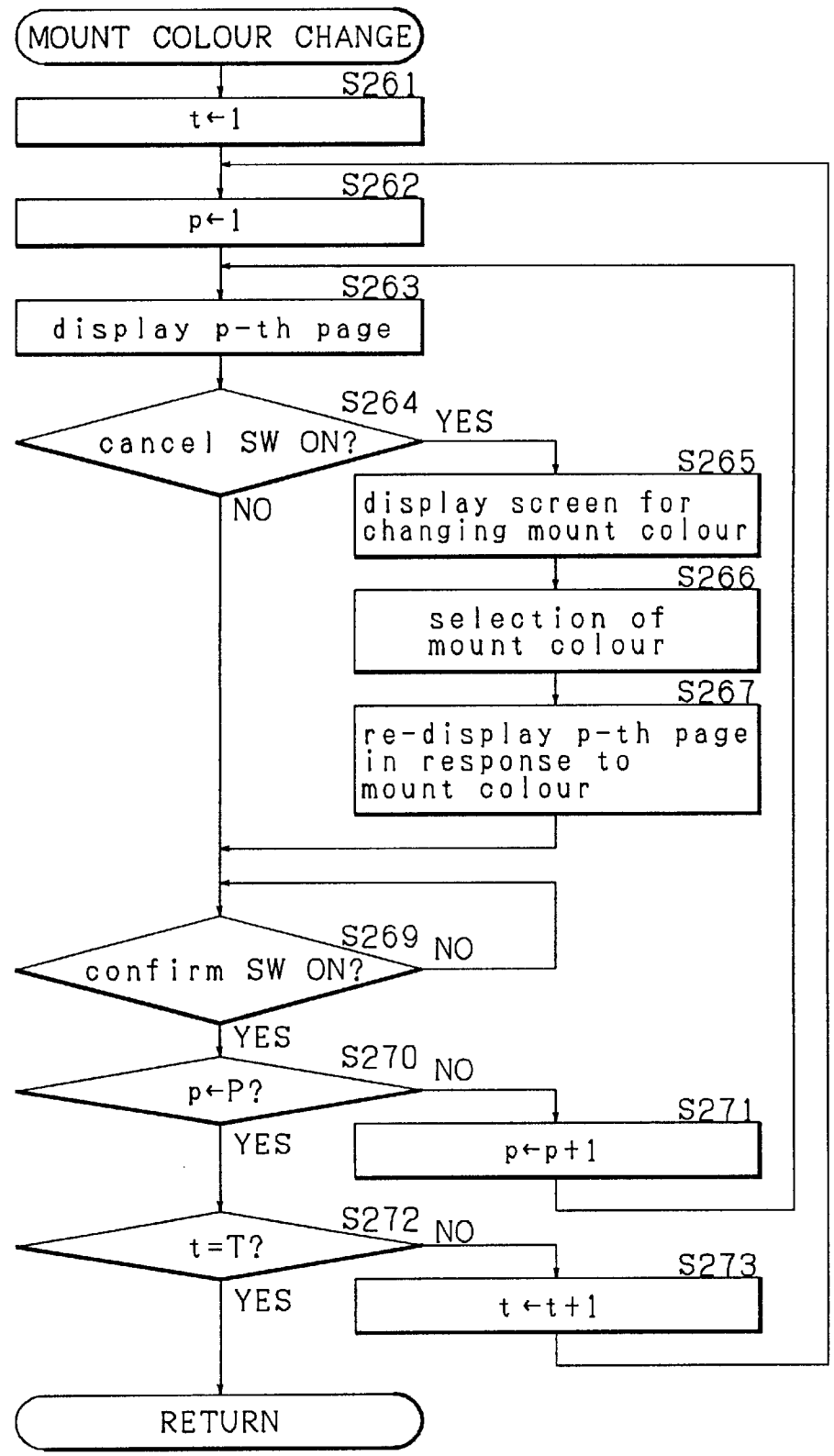
FIG. 35 is a flow chart illustrating a mount color change routine.

FIG. 35 illustrates a sub-routine (of Step S15 shown in FIG. 22) for changing the layout mount. It starts with displaying the first page of the selected sheet (Steps S261 to S263). When the "cancel" key is pressed, a list of colors is displayed (Step S265). As a desired color is selected from the color list (Step S266), the color of the page on the screen is changed and the page is re-displayed (Step S267). Then, the remaining pages are processed in the same manner.

Figure 36:
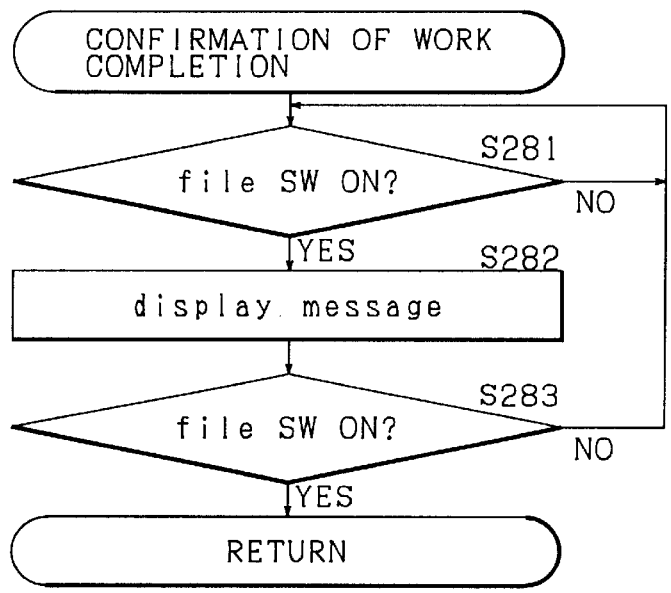
FIG. 36 is a flow chart illustrating a routine for confirmation of work completion.

FIG. 36 illustrates a sub-routine (of Step S17 shown in FIG. 22) for confirming the completion of the work. When the "file" key is pressed, the message shown in FIG. 41 is displayed and the procedure is ended. For confirmation, the "file" key is pressed again (Step S281 to S283).

Figure 37:
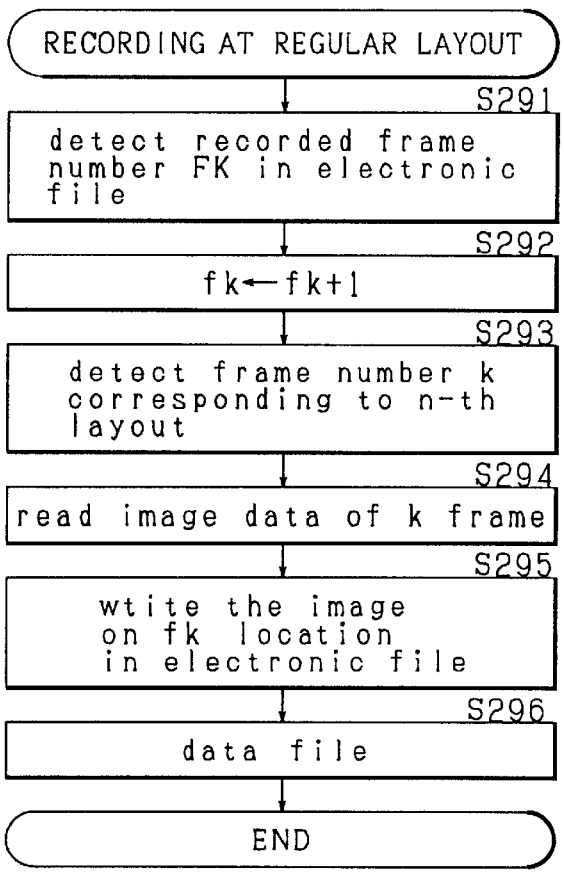
FIG. 37 is a flow chart illustrating a record routine at regular layout.

FIG. 37 is a flow chart of recording of the image layout in the regular layout (at the final step shown in FIG. 22). It starts with detecting the number of recorded frames FK in an electronic file (for adding with newly produced pages) (Step S291). The image data of the processed frame is stored after the recorded frames in the electronic file and its attribute data is filed in a given location of the list (Steps S293 to S296). The steps are repeated until the final page is completed.

Figure 38:
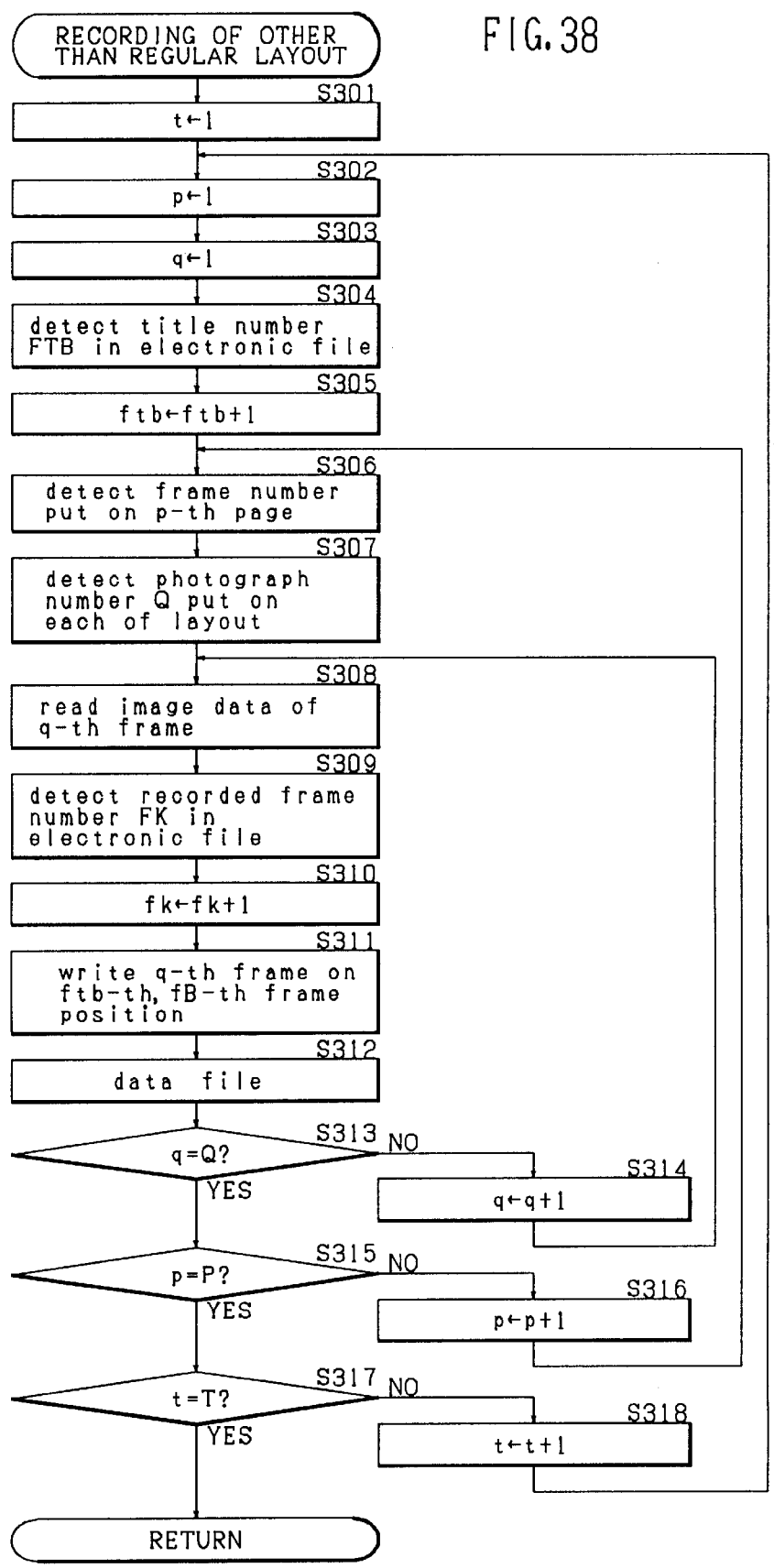
FIG. 38 is a flow chart illustrating a record routine at excepting regular layout.

FIG. 38 is a flow chart in recording of other than the regular layout. It starts with detecting the frames and their page number of each theme block (Step S301 to S307). The image data of the frames on the processed pages are stored after the recorded frames in the electronic file (Steps S308 to S311). Their relevant data are filed in the album list (Step S312). Those data include five items; the number of the theme block, the page numbers, the type of layout, the layout page, and the number of the frame (or seven items with the free mode including the center location and the frame magnification data). The steps are repeated until the final page is completed.

Figure 46:
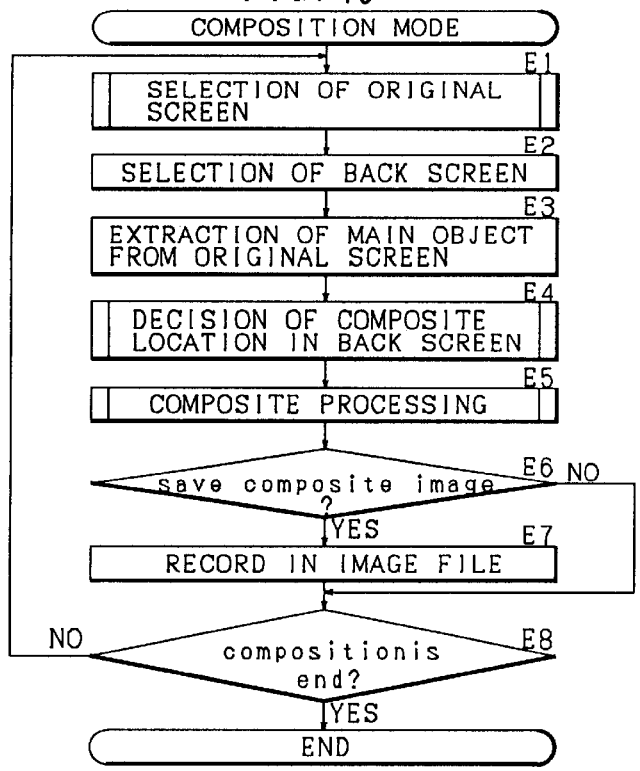
FIG. 46 is a flow chart illustrating a composition mode routine.

The composition of plural images in one single image will now be described as an example of the edit actions applicable in the system of the present invention. FIG. 46 is a flow chart showing an outline procedure with an composition mode. The composition mode is selected using the input unit 37 of the electronic album apparatus 54 or the remote controller 19 of the film player 51 and can be operated on the screen of the display monitor 55. It starts with selecting from a film or the image filing unit 28 a original screen which contains a main object to be extracted (Step E1). Then, a desired back screen is selected on which the main object is composed (Step E2). After the main object is extracted from the original screen selected at Step E1 (Step E3), its location in the back screen selected at Step E2 is determined (Step E4). The main object is composed on the back screen (Step E5). The steps will be explained in more detail referring to FIGS. 47 to 50.

Figure 47:
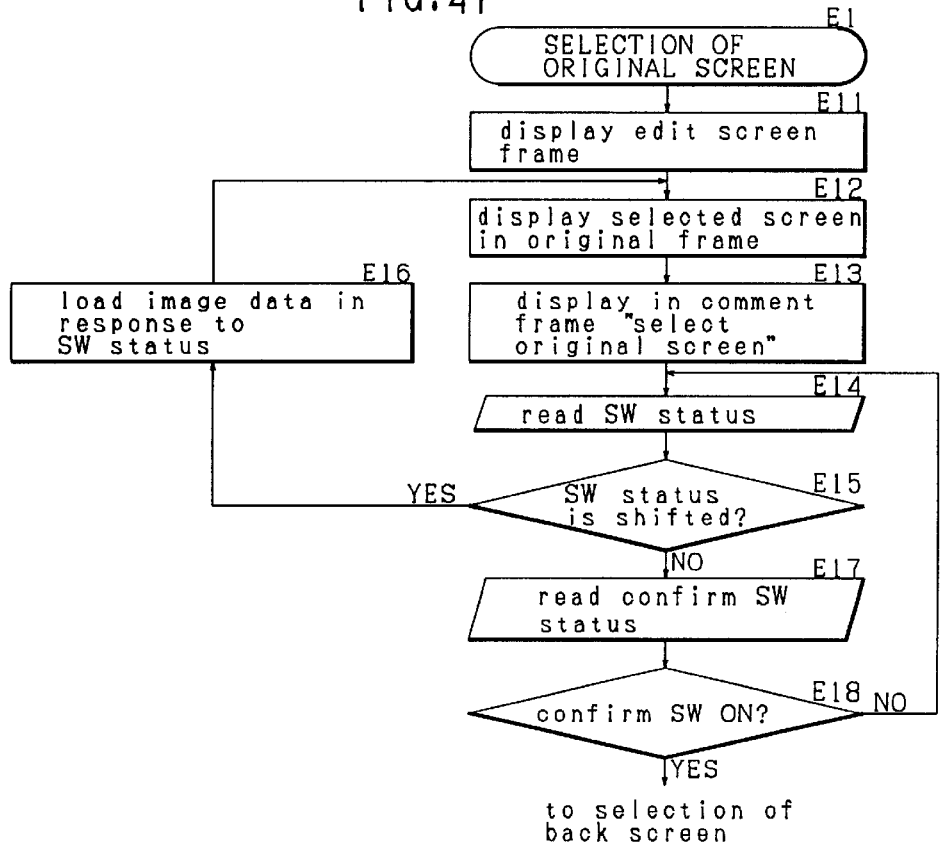
FIG. 47 is a flow chart illustrating an original screen selection routine.
Figure 49:
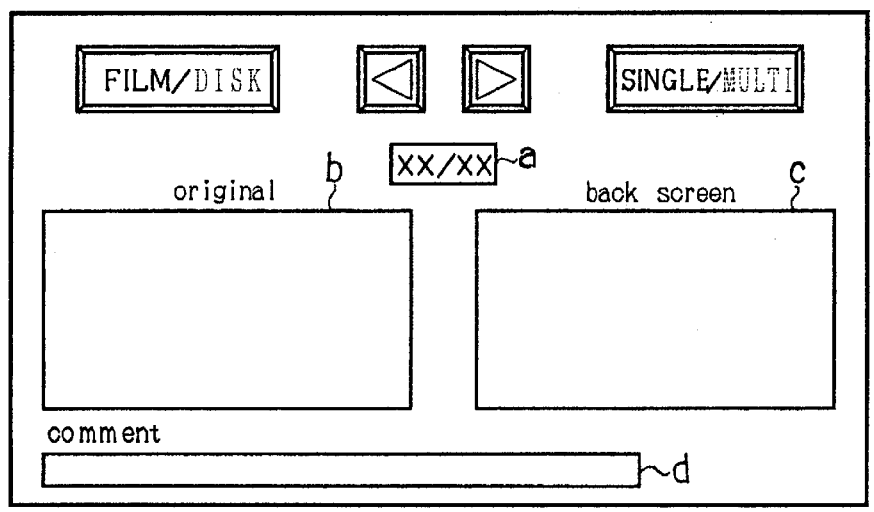
FIG. 49 is a diagram showing a display for edit.

FIG. 47 shows a sub-routine of the selection of the original screen (at Step E1). The initial screen for performing this sub-routine is illustrated in FIG. 49. It starts with displaying the initial edit screen (Substep E11) and allocating the selected screen to an original display area b and its index data to an index display area a (Substep E12). The edit screen is displayed when such display data is transferred from the display data controller 13 to the second memory 10. The display data may be installed as ROM data in the display data controller 13 or in the image filing unit 28 and can thus be read and transmitted via the read unit 30, the data selector 31, and the terminal S6 to the controller 13.

As for the image data, in case the selected screen is from the film 2, the data is transferred via the CCD 4 and the first processor 5 to the first memory 6, and in case the image data is from the image filing unit 28, the data is transmitted via the read unit 30, the data selector 31, and the data expansion unit 32 to the third memory 33. Then, the data is fed to the switching unit 8 via the terminal TS2, and converted to such a size as is suited for the original display area b in the representation controller 9. After that, the image data is written into the corresponding address of the second memory 10 the original display area b. Further, as for the index data, in case the selected screen is from the film 2, the magnetically recorded data (index data) on the film 2 is transferred via the read/write unit 12 to the display data controller 13. In case the selected screen is from the image filing unit 28, the display data (index data) attributed to the image data recorded on the image filing unit 28 together with the image data is transmitted via the read unit 30, the data selector 31, and the terminal TS6 to the display data controller 13. The index data in the display data controller 13 is then output as a text data to the second processor 11 wherein the data is superimposed on the index display area a in the edit screen frame supplied from the second memory 10 for display on the screen.

Returning to FIG. 47, the procedure is continued by displaying the selection of the original screen in a comment display frame d (Substep E13), reading the status of the command keys (Substep E14) and examining whether the status of the keys are shifted or not (Substep E15). If shifted, image data of another frame is loaded from the film 2 or image filing unit 28 (Substep E16) and displayed as processed at Substep E12. The command keys include a filing image selecting key, forward and backward keys, and a single/multi-image selector key. If the key are not shifted at Substep E15, the procedure moves to Substep E17 for reading the status of the "confirm" key. If the key is off, the procedure returns to Substep E14. If on, it advances to the back screen selection (Step E2). The procedure of the back screen selection is similar to that of the original screen selection except the displaying of the edit screen frame and will thereof not be explained.

After the selection of the back screen is completed, the procedure goes to the extraction of the main object from the original screen (Step E3). The extraction may be carried out by an automatic method such as a hue-specified region extraction or manual method such and using a light pen, as will be not depicted in detail herein.

Figure 48:
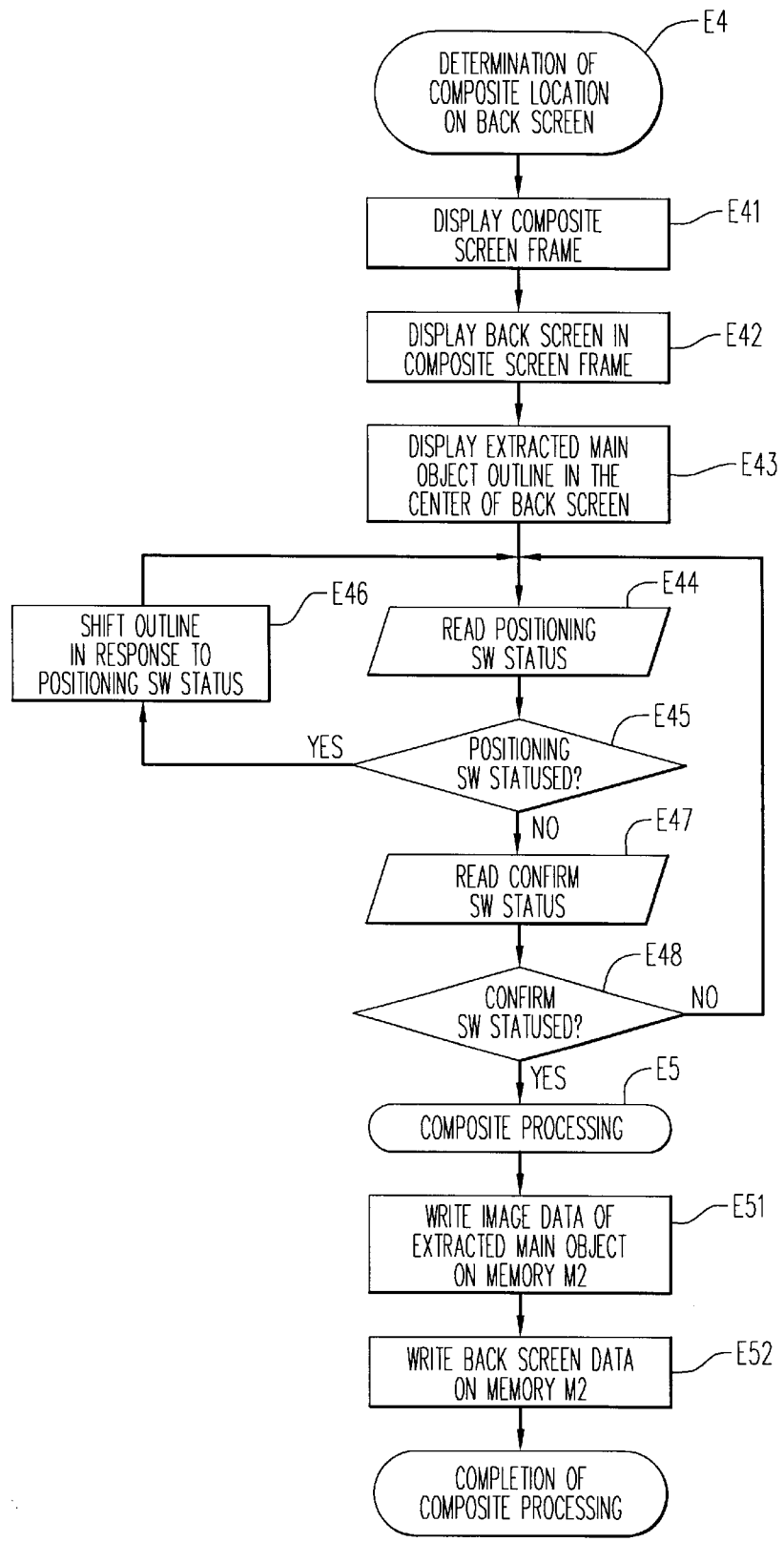
FIG. 48 is a flow chart illustrating a decision routine of composite position in a back screen.
Figure 50:
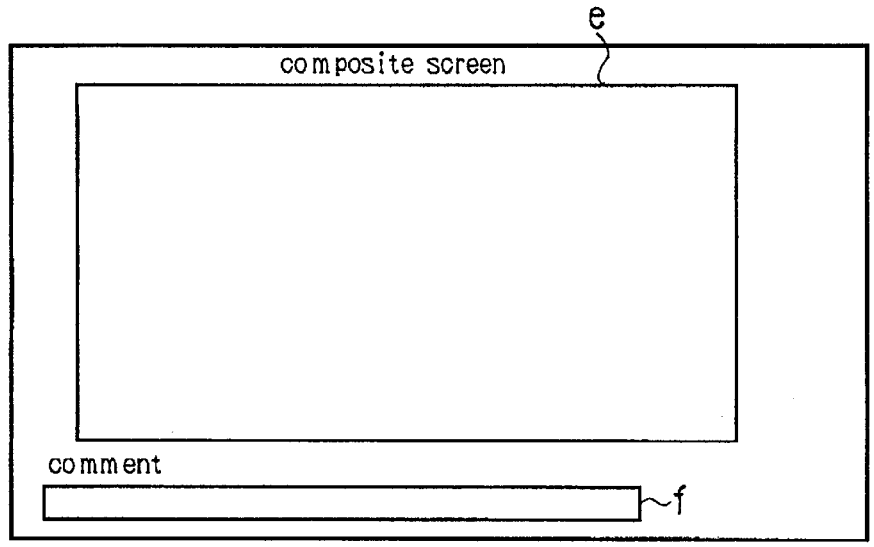
FIG. 50 is a diagram showing a display for composition.

FIG. 48 shows the steps of determining the location of composition on the back screen (E4) and composite processing (E5). The procedure starts with, as shown in FIG. 50, displaying a composite screen frame e (Substep E41) and displaying the back screen which is previously selected in the composite screen frame e (Substep E42). The beginning steps are identical to those of the original screen selection. After the outline of the main object is placed in the center of the background (Substep E43), the status of a positioning switch is checked (Substep E45). If the status is varied, the location of the outlines of the main object is shifted (Substep E46) and the status of the positioning switch is checked again. If no status change, the procedure goes to Substep E47 for reading the status of the "confirm" key (Substep E47). The positioning switch may be a panning switch such as a mouse for entering the position coordinate values on a plane. The outline of the main object is constructed during the extraction of the main object from the original screen (Step E3) and saved in the data display controller 13. The outline is displayed by transferring a display data of white pattern made from the extracted data to the second memory 10.

If the "confirm" key read at Substep E47 is found to be off at Substep E48, the procedure returns to Substep E44. When the key is on, the location of composition is determined and the procedure goes to Step E5. For composition of the two images, the image data of the main object extracted is read from the first memory 6 or third memory 33 and written to the address in the second memory 10 corresponding to the composition location on the back screen determined at Step E4 (Substep E51). Then, the image data of the back screen is read from the first memory 6 or third memory 33 and written to a corresponding address in the second memory 10 (Substep E52), and composite processing is complete. If both the original screen and the back screen belong to the same film 2 or the image filing unit 28, the image data of the back screen has to be read from the film and loaded into the first memory 6 or from the image filing unit 28 and into the third memory 33.

Returning to FIG. 46, after the composition, the text data is transferred from the display data controller 13 to the second processor 11 for displaying a superimposed message whether or not the resultant composite image is saved in the image filing unit 28, and waiting until the "file" key or "cancel" key is pressed (Step E6). If the "file" key is turned on, the data of the composite image is transmitted via the second memory 10, the terminal TS1, the compression unit 25, the MIX unit 26, and the write unit 27 to the image filing unit 28 for storage (Step E7). It is then checked whether the composition mode is ended or not (Step E8) and when the "cancel" key is pressed, the procedure moves back to Step E1.

Figure 51:
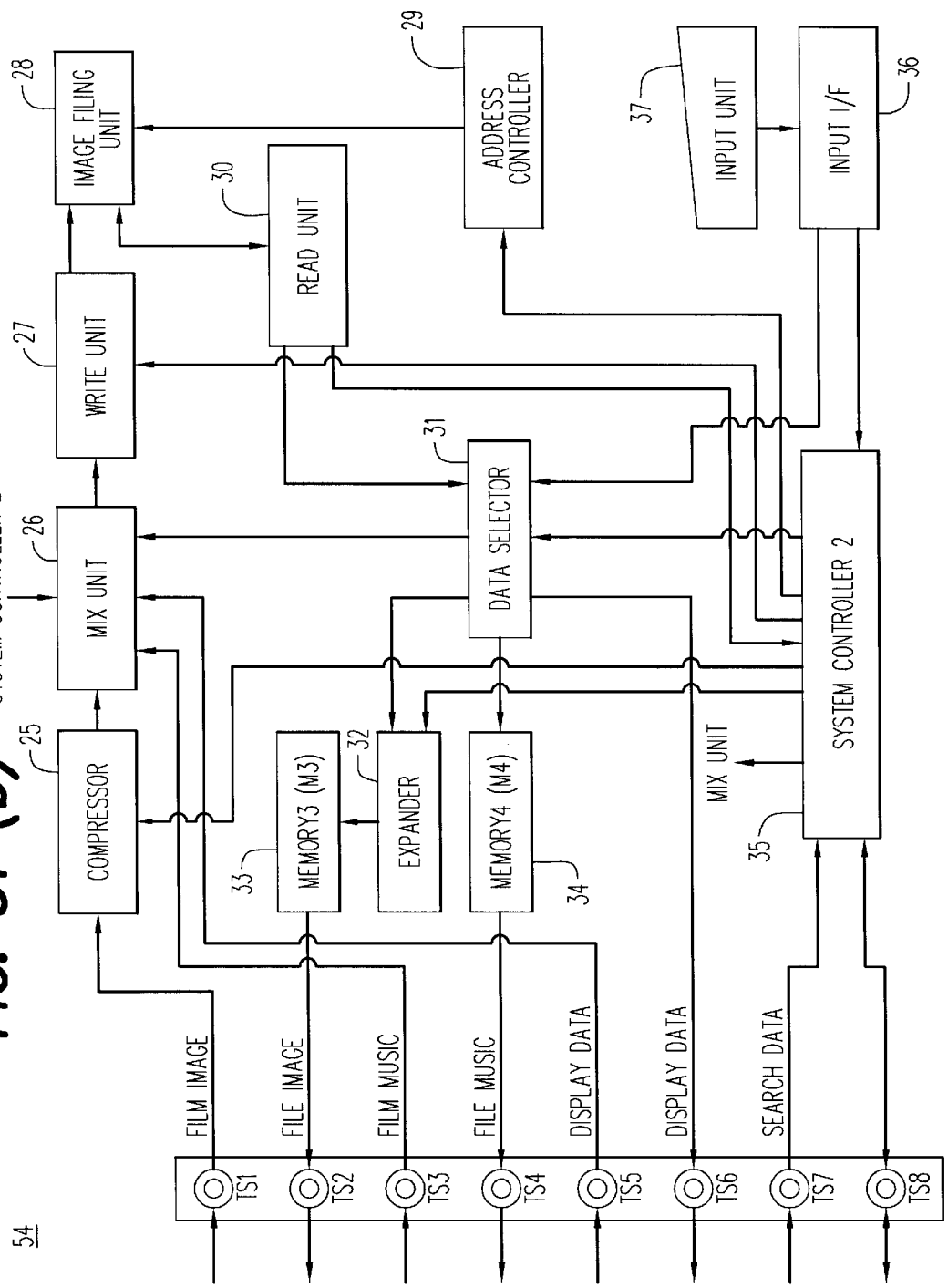
FIGS. 51(a)–51(b) are block diagrams showing another embodiment of a system.

Although the film player 51 of the foregoing embodiment converts frame image of a photographic film into image data for filing, it may file printed pictures in an electronic album. FIGS. 51(a)(b) illustrates a block diagram of the internal arrangements of the film player and the electronic album apparatus for processing and filing a printed picture. Distinguished parts from the arrangement shown in FIGS. 2(a)(b) only will be explained. In this embodiment, a light reflection operation is used in which light from the light source 1 is reflected on the printed picture 2' and a different type of imaging device is applied. As the printed picture is varied in size, for example, E or L size, if the same imaging device 4 is used for both size picture, the reproducing output must be changed. The receptor into which the printed picture is loaded is also altered as compared with the loading of a film. The other components and arrangements in the system are identical to those of FIGS. 2(a)(b).

Figure 52:
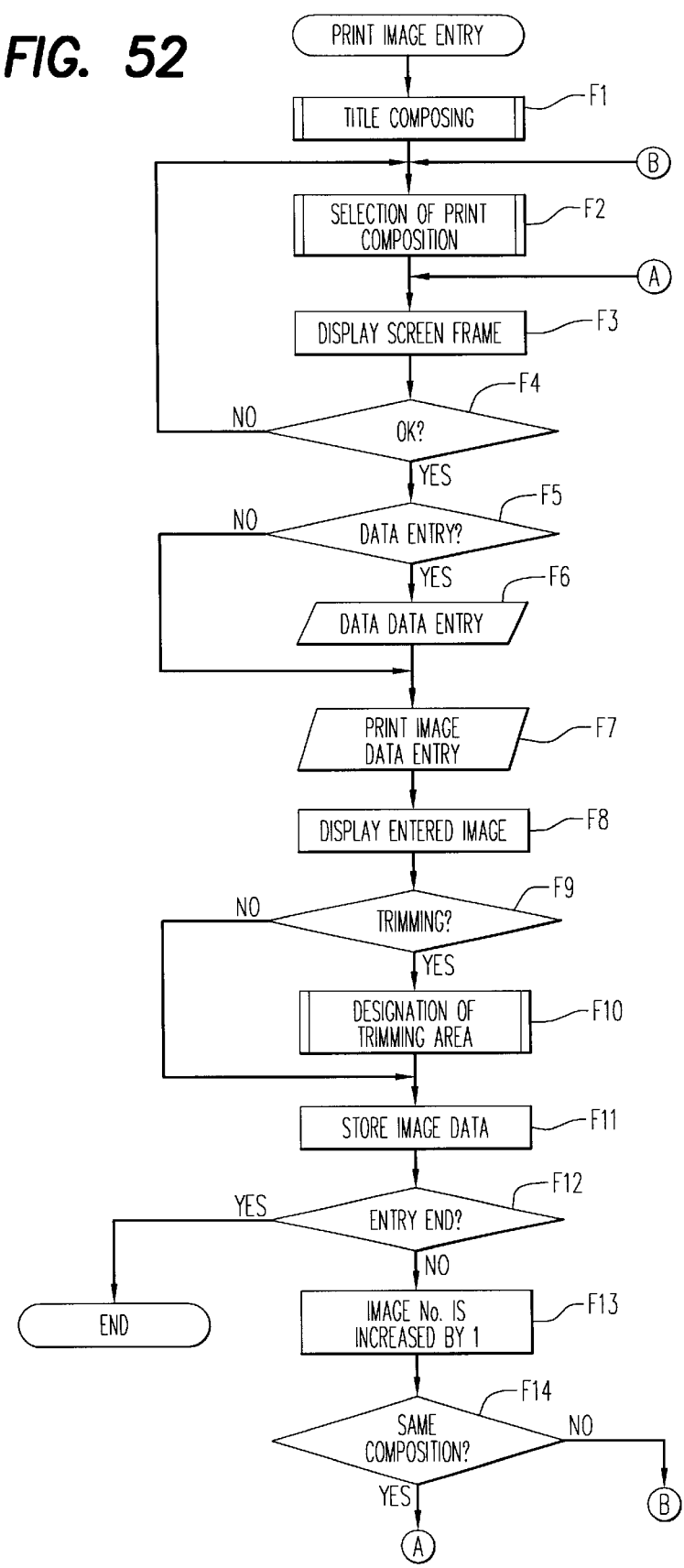
FIG. 52 is a flow chart illustrating the input routine of print image.

FIG. 52 is a flow chart for entry of a printed picture image. The printed pictures may be loaded one by one into the player or a series of them may preliminarily be arranged in a cassette which in turn is loaded into the player. The above two loading methods are different in operation and the former one-by-one method will be explained. It starts with composing a title of the printed picture(s) (Step F1). The series of images are designated by the title and thus the title may be used for searching an image. Then, the size and frame composition (shape) of the print to be reproduced are selected (Step F2), and the screen frame is displayed on the monitor 55 as shown in FIG. 56 (Step F3). The display of screen frame is reviewed for confirmation of an image composition to be reproduced (Step F4) and the data is entered with the dating switch turned on (Steps F5 and F6). The information of the date, like the title, can be used for searching the image data.

The image data of the printed picture image is entered (Step F7) and displayed on the screen (Step F8). If a trimming switch is off, the image data entered is directly stored. If the trimming switch is on, a trimming area is designated and its image data is stored (Steps F9 to F11). It is checked whether an entry end switch is on or not (Step F12). If not, the procedure is continued with the number of a frame automatically increased by one (Step F13). The frame number is a serial number of one of images saved under the same title. Each image is identified with its serial number. As the procedure continues, it is examined whether or not the size and composition of a succeeding printed picture is the same as of the previous picture (Step F14). If yes, the procedure goes back to Step F3 for repeating the same steps. If not, the procedure returns to Step F2 where the size and composition are selected again as followed by the above steps.

Figure 53:
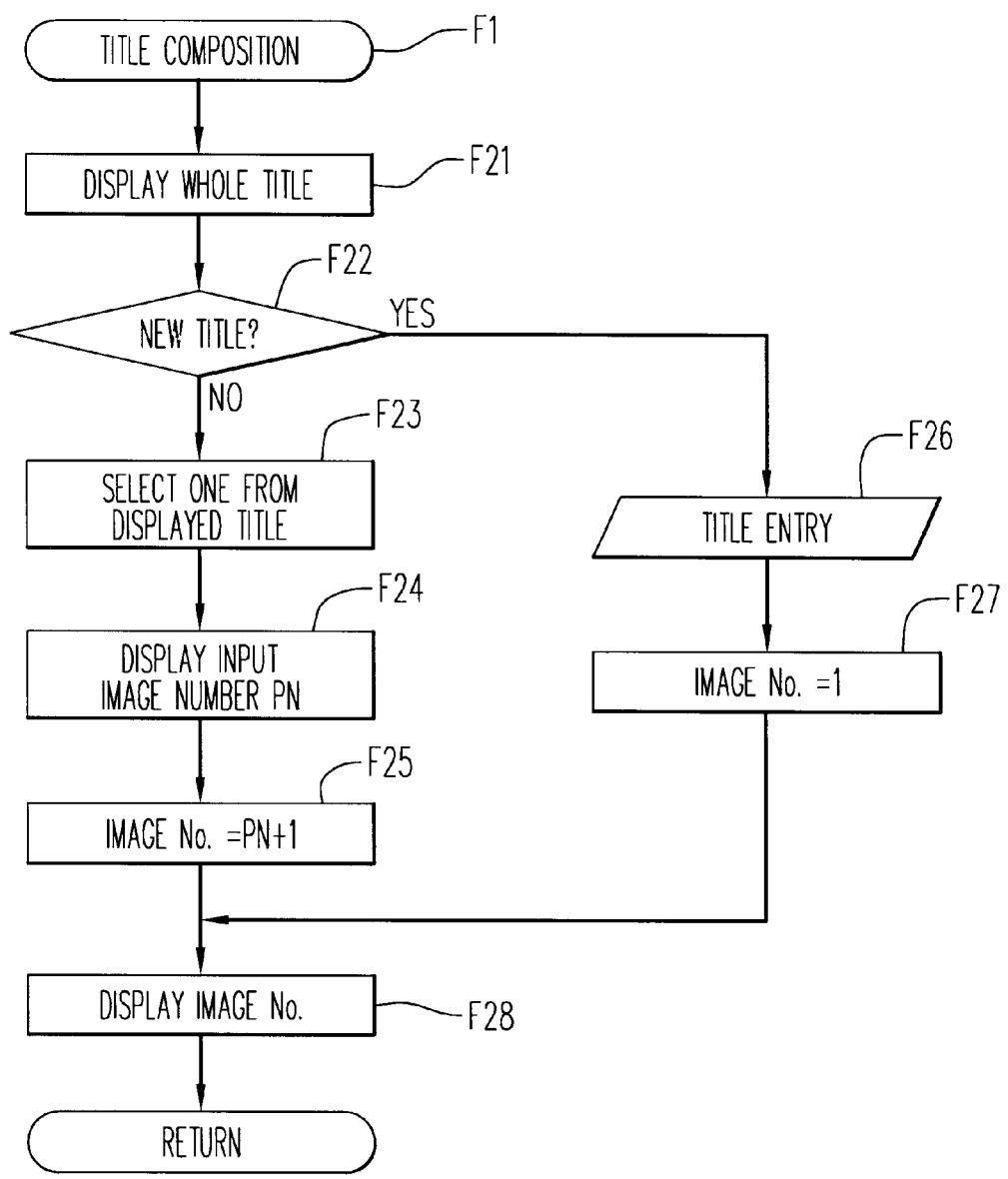
FIG. 53 is a flow chart illustrating a title composing routine.

Referring to FIG. 53, the composition of the title will now be explained in more detail. The list of titles stored is read from the image filing unit 28 and displayed on the screen (Substep F21). Input printed pictures may be attributed to one of the existing titles or to a new title. If they belong to the existing title, the title is selected from the list (Substep F23) and the number of images PN stored under the title is displayed (Substep F24). The serial number of the input picture is designated as following the total of the existing image numbers. If the input image data requires a new title, a new title name is entered (Substep F26). In this case, the serial number of the input image is designated as 1. The display of the titles and reading method are identical to those of the edit action and will not be explained.

Figure 54:
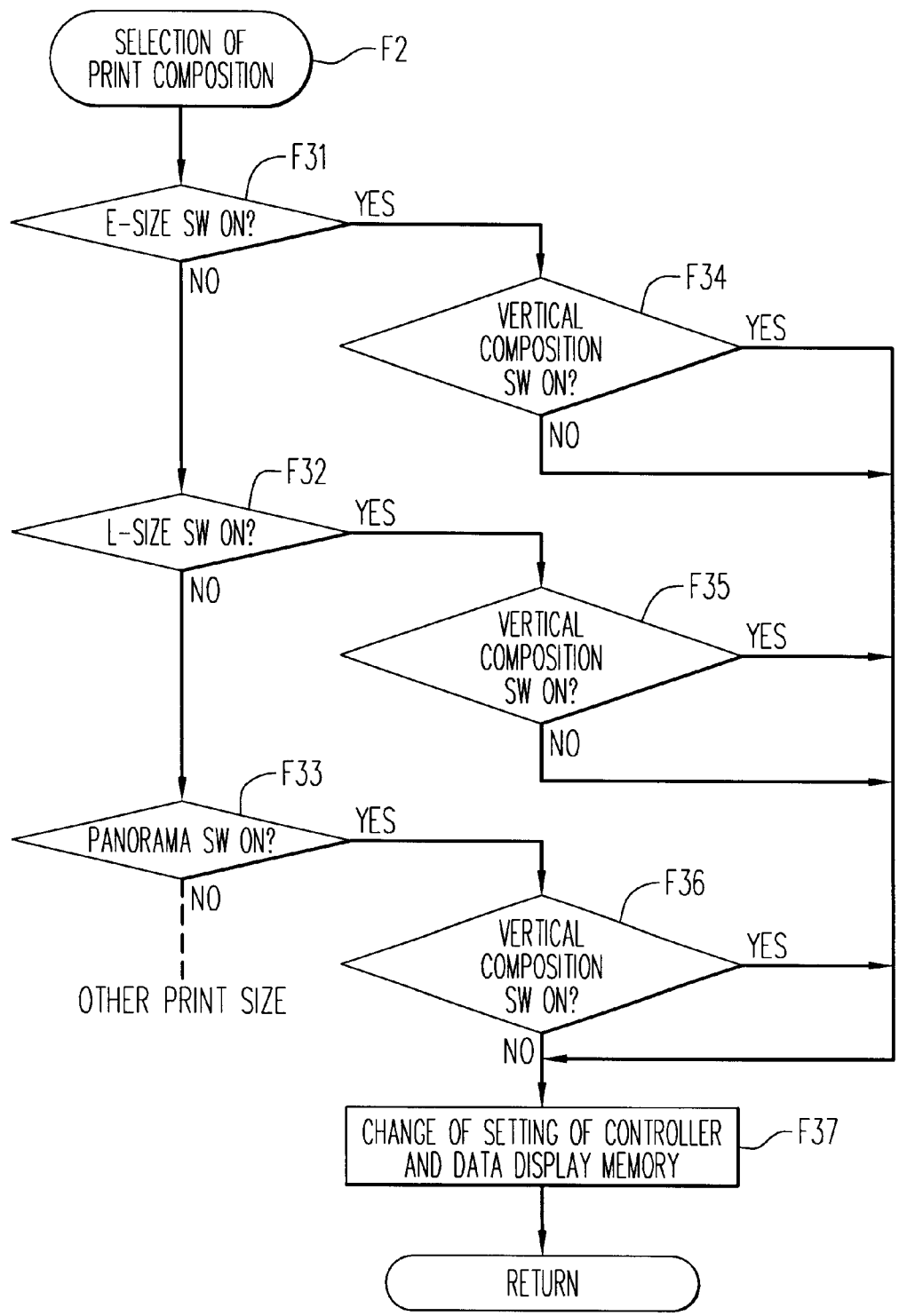
FIG. 54 is a flow chart illustrating a print composition selection routine.

The selection of composition of a printed picture (Step F2) will be described in more detail referring to FIG. 54. The composition of the print is defined by a combination of a print size E or L, and a proportion between vertical and horizontal lengths at phototaking. The print size is first selected using a set of size switches (Substeps F31 to F33). In this embodiment, three sizes are checked but other sizes may also be checked with extra switches. The selection may be performed by choosing one from a list of the sizes displayed on the screen. Further, in each size, the proportion is then chosen (Substeps F34 to F36). According to the embodiment, if the printed picture to be read has a vertical proportion, the corresponding switch or key is pressed by the operator. It is also possible to select the proportion using a two-position selector switch or a cursor on the screen. Then, settings of the imaging device including a scanning speed and a scanning width or display data memories are changed in response to the selected composition of print, and data processing such as a rotation of the image data of the picture on the screen is carried out (Substep F37).

The designation of a trimming area of the input image (Step F10) will be explained in more detail referring to FIG. 55. It starts with deciding the center of a trimming area on the screen with a light pen or mouse (Substeps F41 and F42). While a zoom-up switch is being pressed, the image on the screen is zoomed up (Substeps F43 and F44). The zooming may be performed with one increment step per switching action. As described above, the filing of various types of printed pictures or photographs is performed by the system of the present invention.

The present invention is not limited to the system of the foregoing embodiment and other changes and modifications are possible. For example, the present invention allows image data recorded with a still video camera to be saved in electronic files in the same manner. Also, it will be apparent to one of ordinary skill in the art that many changes and modifications can be made thereto without departing from the spirit and scope of the invention as set forth herein.

What is claimed is:

1. An electronic filing system for filing a photographed image recorded on a film, wherein the film records photographic information relating to the image in addition to the photographed image, the filing system comprising:

image sensing means for sensing a photographed image recorded on the film;

reading means for reading the photographic information that is recorded on the film in addition to the photographed image;

a recording medium for recording a plurality of images and the photographic information; and writing means for writing the image sensed by said image sensing means and the photographic information read by said reading means together on said recording medium.

2. An electronic filing system as claimed in claim 1, further comprising:

first selecting means for selecting at least one image from the photographed images recorded on the film; and second selecting means for manually selecting a recording area in the recording medium by user operation;

wherein the writing means writes the image selected by the first selecting means and the photographic information relating to the selected image on the recording area selected by the second selecting means.

3. An electronic filing system as claimed in claim 1, wherein the film is developed and the photographic information is magnetically recorded on the film.

4. An electronic filing system as claimed in claim 1, wherein the recording medium is an optical disk.

5. An electronic filing system as claimed in claim 1, further comprising; searching means for searching the image recorded on the recording medium based on the photographic information written on the recording medium.

6. An electronic filing system for filing a photographed image recorded on a film, the filing system comprising:

image sensing means for sensing a photographed image recorded on the film;

a recording medium capable of recording a plurality of images thereon for reading out the recorded images therefrom;

writing means for writing an image sensed by said image sensing means on said recording medium;

read out means for reading out an image previously recorded on said recording medium; and control means for controlling said writing means so that the image sensed by said image sensing means is written on said recording medium in connection with an image read out by said read out means.

7. An electronic filing system as claimed in claim 6, wherein the image read out by the read out means is written previously on the recording medium.

8. An electronic filing system as claimed in claim 7, wherein the image written previously on the recording medium is a image for layout displaying the photographed image of the film.

9. An electronic filing system as claimed in claim 6, wherein the control means composes the image sensed by the image sensing means and the image read out by the read out means from the recording medium.

10. An electronic filing system as claimed in claim 6, wherein the film is developed and the recording medium is an optical disk.

11. An electronic filing system for filing a photographed image recorded on a film, the filing system comprising:

image sensing means for sensing a photographed image recorded on the film;

a recording medium capable of recording a plurality of images thereon for reading out the recorded images therefrom;

writing means for writing an image sensed by said image sensing means on said recording medium;

read out means for reading out an image previously recorded on said recording medium;

deciding means for deciding a recording style of the image sensed by said image sensing means in accordance with the image read out by said read out means; and control means for controlling said writing means so that the image sensed by said image sensing means is written in the recording style decided by said deciding means.

12. An electronic filing system as claimed in claim 11, wherein the image read out by the read out means is written previously on the recording medium.

13. An electronic filing system as claimed in claim 11, wherein the recording style decided by the deciding means relates to a layout regarding how to arrange the photographed image of the film.

14. An electronic filing system as claimed in claim 11, wherein the film is developed and the recording medium is an optical disk.

15. An electronic filing system for filing a photographed image recorded on a film, the filing system comprising:

image sensing means for sensing a photographed image recorded on the film;

a recording medium on which image data was recorded previously;

read out means for reading out the image recorded on said recording medium;

composing means for composing the image sensed by said image sensing means and the image data read out by said read out means; and writing means for writing the image composed by said composing means on said recording medium.

16. An electronic filing system as claimed in claim 15, wherein the image data recorded previously on the recording medium is a data for layout displaying the photographed image of the film.

17. An electronic filing system as claimed in claim 15, wherein the film is developed and the recording medium is an optical disk.

\* \* \* \* \*